United States Patent
Patchava et al.

(10) Patent No.: US 12,132,538 B2
(45) Date of Patent: Oct. 29, 2024

(54) TWO STAGE CODEBOOK BEAMFORMING FOR CHANNEL ESTIMATION IN PASSIVE DEVICES

(71) Applicant: QUALCOMM Incorporated, San Diego, CA (US)

(72) Inventors: Raviteja Patchava, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/192,596

(22) Filed: Mar. 29, 2023

(65) Prior Publication Data

US 2024/0333346 A1 Oct. 3, 2024

(51) Int. Cl.
*H04B 7/04* (2017.01)
*H04B 7/0456* (2017.01)

(52) U.S. Cl.
CPC ................. *H04B 7/0456* (2013.01)

(58) Field of Classification Search
CPC .................................................. H04B 7/0456
See application file for complete search history.

(56) References Cited

U.S. PATENT DOCUMENTS

2016/0196455 A1* 7/2016 Gudan .................. H04B 5/77
340/10.5

FOREIGN PATENT DOCUMENTS

| WO | 2019149341 A1 | 8/2019 |
|---|---|---|
| WO | 2020167584 A1 | 8/2020 |
| WO | 2022200673 A1 | 9/2022 |

OTHER PUBLICATIONS

International Search Report and Written Opinion—PCT/US2024/017118—ISA/EPO—Jun. 17, 2024 (2301901WO).
Liu et al., Next Generation Backscatter Communication: Systems, Techniques and Applications, Arxiv.Org, Cornell University Library, 201 Olin Library Cornell University, Ithaca, NY 14853, Mar. 27, 2019, XP081126728, pp. 1-10.

* cited by examiner

*Primary Examiner* — Rahel Guarino
(74) *Attorney, Agent, or Firm* — Holland & Hart LLP

(57) ABSTRACT

Methods, systems, and devices for wireless communications are described. A network node may transmit a set of reference signals via a corresponding set of antennas, each antenna in the corresponding set of antennas associated with a unique precoding vector, wherein each precoding vector uses a combinational codeword based on a combination of codewords from a set of available codewords. The network node may receive, from an energy harvesting (EH)-capable device, a set of frequency-shifted backscatter responses corresponding to at least a subset of the set of reference signals. The network node may transmit, to the EH-capable device, a signal based on channel state information, wherein the channel state information is based on the set of frequency-shifted backscatter responses.

30 Claims, 17 Drawing Sheets

TWO STAGE CODEBOOK BEAMFORMING FOR CHANNEL ESTIMATION IN PASSIVE DEVICES

TECHNICAL FIELD

The following relates to wireless communications, including two stage codebook beamforming for channel estimation in passive devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support two stage codebook beamforming for channel estimation in passive devices. For example, the described techniques provide for improved channel estimation (e.g., channel state information (CSI) estimation) in passive devices, such as an energy harvesting (EH)-capable device. This may include a network node (e.g., a reader) transmitting a set of reference signals to an EH-capable device via a corresponding set of antennas. The antennas in the corresponding set of antennas may each be associated with a unique precoding vector (e.g., the precoding vector used for beamforming the reference signal). In some examples, each precoding vector may be or otherwise use a combinational codeword based on a combination of codewords from a set of available codewords. The EH-capable device may receive the reference signals and transmit a set of frequency-shifted backscatter responses that correspond to at least a subset of the set of reference signals. For example, the EH-capable device may receive a subset of the set of reference signals at a threshold input power level and backscatter the response(s), wherein the backscattering applies a frequency shift. The reader may receive the set of frequency-shifted backscatter responses and use this information to identify or otherwise determine the CSI for the wireless channel between the reader and the EH-capable device. Accordingly, the reader may transmit a signal to the EH-capable device based on the CSI. That is, the CSI may be based on the set of frequency-shifted backscatter responses.

A method for wireless communications at a network node is described. The method may include transmitting a set of reference signals via a corresponding set of antennas, each antenna in the corresponding set of antennas associated with a unique precoding vector, where each precoding vector uses a combinational codeword based on a combination of codewords from a set of available codewords, receiving, from an EH-capable device, a set of frequency-shifted backscatter responses corresponding to at least a subset of the set of reference signals, and transmitting, to the EH-capable device, a signal based on channel state information, where the channel state information is based on the set of frequency-shifted backscatter responses.

An apparatus for wireless communications at a network node is described. The apparatus may include at least one processor and memory coupled (e.g., operatively, communicatively, functionally, electronically, or electrically) with the at least one processor, the memory storing instructions. The instructions may be executable by (e.g., directly, indirectly, after pre-coding, without pre-processing) the at least one processor to cause the network node to transmit a set of reference signals via a corresponding set of antennas, each antenna in the corresponding set of antennas associated with a unique precoding vector, where each precoding vector uses a combinational codeword based on a combination of codewords from a set of available codewords, receive, from an EH-capable device, a set of frequency-shifted backscatter responses corresponding to at least a subset of the set of reference signals, and transmit, to the EH-capable device, a signal based on channel state information, where the channel state information is based on the set of frequency-shifted backscatter responses.

Another apparatus for wireless communications at a network node is described. The apparatus may include means for transmitting a set of reference signals via a corresponding set of antennas, each antenna in the corresponding set of antennas associated with a unique precoding vector, where each precoding vector uses a combinational codeword based on a combination of codewords from a set of available codewords, means for receiving, from an EH-capable device, a set of frequency-shifted backscatter responses corresponding to at least a subset of the set of reference signals, and means for transmitting, to the EH-capable device, a signal based on channel state information, where the channel state information is based on the set of frequency-shifted backscatter responses.

A non-transitory computer-readable medium storing code for wireless communications at a network node is described. The code may include instructions executable by at least one processor (e.g., directly, indirectly, after pre-coding, without pre-processing) to transmit a set of reference signals via a corresponding set of antennas, each antenna in the corresponding set of antennas associated with a unique precoding vector, where each precoding vector uses a combinational codeword based on a combination of codewords from a set of available codewords, receive, from an EH-capable device, a set of frequency-shifted backscatter responses corresponding to at least a subset of the set of reference signals, and transmit, to the EH-capable device, a signal based on channel state information, where the channel state information is based on the set of frequency-shifted backscatter responses.

Some examples of the method, apparatuses, and non-transitory computer-readable medium described herein may further include operations, features, means, or instructions for combining a first set of codewords from a discrete Fourier transform (DFT) codebook to obtain a first combination of codewords to determine a first precoding vector used when transmitting a first reference signal in the set of reference signals, where the DFT codebook includes the set of available codewords and combining a second set of codewords from the DFT codebook to obtain a second combination of codewords to determine a second precoding vector used when transmitting a second reference signal in the set of reference signals, where the first set of codewords and the second set of codewords include one or more different codewords.

Some examples of the method, apparatuses, and non-transitory computer-readable medium described herein may further include operations, features, means, or instructions for determining a number of codewords to be included in the first set of codewords, the second set of codewords, or both, based on a previously received set of frequency-shifted backscatter responses.

In some examples of the method, apparatuses, and non-transitory computer-readable medium described herein, the number of codewords may be determined based on ratio between the previously received set of frequency-shifted backscatter responses and the number of codewords satisfying a threshold.

In some examples of the method, apparatuses, and non-transitory computer-readable medium described herein, identifying, based on the set of frequency-shifted backscatter responses, a subset of precoding vectors to use for subsequent transmissions to the EH-capable device.

Some examples of the method, apparatuses, and non-transitory computer-readable medium described herein may further include operations, features, means, or instructions for identifying a subset of frequency-shifted backscatter responses from the set of frequency-shifted backscatter responses that satisfy a threshold and transmitting, based on the subset of frequency-shifted backscatter responses, a second set of reference signals via a corresponding subset of antennas in the corresponding set of antennas.

Some examples of the method, apparatuses, and non-transitory computer-readable medium described herein may further include operations, features, means, or instructions for changing a transmission frequency for the second set of reference signals relative to the set of reference signals.

Some examples of the method, apparatuses, and non-transitory computer-readable medium described herein may further include operations, features, means, or instructions for performing multiple transmissions of the second set of reference signals via the corresponding subset of antennas.

In some examples of the method, apparatuses, and non-transitory computer-readable medium described herein, each antenna in the subset of antennas may be associated with the precoding vector used during transmission of the set of reference signals or with an updated precoding vector different from the precoding vector and the updated precoding vector may be based on the threshold.

Some examples of the method, apparatuses, and non-transitory computer-readable medium described herein may further include operations, features, means, or instructions for determining the channel state information based on a subset of the frequency-shifted backscatter responses from the set of frequency-shifted backscatter responses.

In some examples of the method, apparatuses, and non-transitory computer-readable medium described herein, time division multiplexing, frequency division multiplexing, code division multiplexing, or a combination thereof, the reference signals in the set of reference signals.

Some examples of the method, apparatuses, and non-transitory computer-readable medium described herein may further include operations, features, means, or instructions for selecting a precoding vector to use to transmit the signal based on the set of frequency-shifted backscatter responses.

A method for wireless communications at an EH-capable device is described. The method may include receiving, from a network node, control information including an indication of a frequency shift to apply to backscatter modulation, receiving, from the network node, a set of reference signals, and backscattering a set of frequency-shifted backscatter responses corresponding to at least a subset of reference signals from the set of reference signals.

An apparatus for wireless communications at an EH-capable device is described. The apparatus may include at least one processor and memory coupled (e.g., operatively, communicatively, functionally, electronically, or electrically) with the at least one processor, the memory storing instructions. The instructions may be executable by (e.g., directly, indirectly, after pre-coding, without pre-processing) the at least one processor to cause the EH-capable device to receive, from a network node, control information including an indication of a frequency shift to apply to backscatter modulation, receive, from the network node, a set of reference signals, and backscatter a set of frequency-shifted backscatter responses corresponding to at least a subset of reference signals from the set of reference signals.

Another apparatus for wireless communications at an EH-capable device is described. The apparatus may include means for receiving, from a network node, control information including an indication of a frequency shift to apply to backscatter modulation, means for receiving, from the network node, a set of reference signals, and means for backscattering a set of frequency-shifted backscatter responses corresponding to at least a subset of reference signals from the set of reference signals.

A non-transitory computer-readable medium storing code for wireless communications at an EH-capable device is described. The code may include instructions executable by at least one processor (e.g., directly, indirectly, after pre-coding, without pre-processing) to receive, from a network node, control information including an indication of a frequency shift to apply to backscatter modulation, receive, from the network node, a set of reference signals, and backscatter a set of frequency-shifted backscatter responses corresponding to at least a subset of reference signals from the set of reference signals.

In some examples of the method, apparatuses, and non-transitory computer-readable medium described herein, the control information indicates a same frequency shift to apply to the reference signals in the set of reference signals.

In some examples of the method, apparatuses, and non-transitory computer-readable medium described herein, the control information includes an identifier for the EH-capable device.

In some examples of the method, apparatuses, and non-transitory computer-readable medium described herein, the control information includes an indication to apply a same reflection coefficient to the set of reference signals.

Some examples of the method, apparatuses, and non-transitory computer-readable medium described herein may further include operations, features, means, or instructions for receiving, from the network node, a signal based on the set of frequency-shifted backscatter responses.

DETAILED DESCRIPTION

Figure 1:
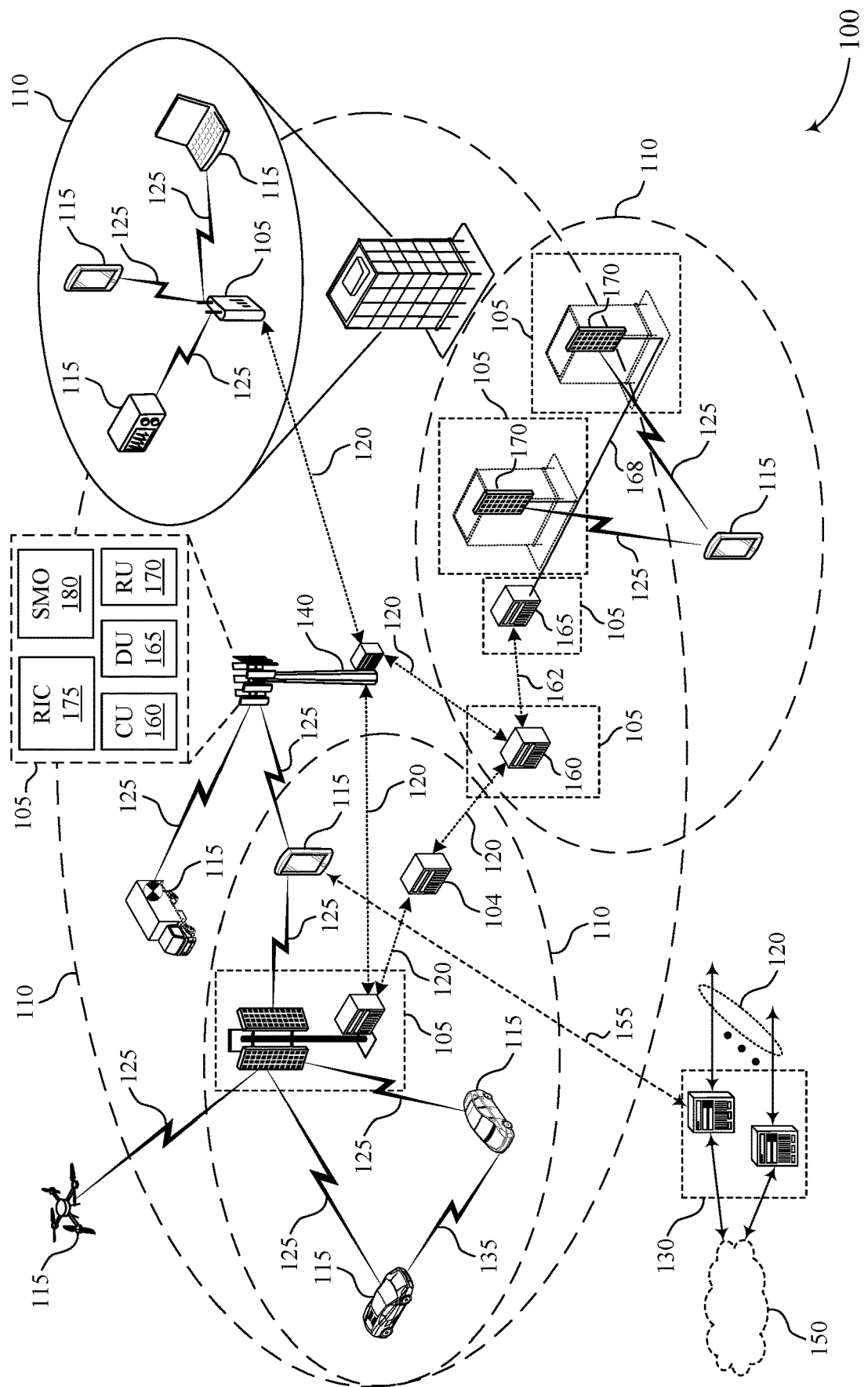
FIG. 1 shows an example of a wireless communications system that supports two stage codebook beamforming for channel estimation in passive devices in accordance with one or more aspects of the present disclosure.

Some low-cost and low-complexity devices implement radio frequency identification (RFID) techniques for communications, for example, instead of or in addition to communications via a Uu, Wi-Fi, or PC5 interface. RFID techniques are very low power communications, commonly relying on backscatter modulation. In systems that use backscatter modulation, an interrogation signal from an interrogating device (e.g., a network node/RFID reader) is reflected back to the interrogating device by the interrogated device (e.g., the RFID tag or energy harvesting (EH)-capable device) with information modulated on the reflected signal. Accordingly, an EH-capable device may consume relatively little power, as most (or all) of the energy used to backscatter communications is provided by the interrogating device. Backscatter modulation supports a short range (e.g., less than 10 meters), as the power of the downlink signal (the interrogating signal) generally may have to be sufficiently high to support energy-harvesting at the EH-capable device (e.g., more than −13 dBm). Additionally, multi-path reflections can cause fading and further decrease the range. To increase the received power of the interrogating signal at the EH-capable device, the reader may perform channel selection and/or spatial beamforming for the interrogating signal based on channel state information (CSI). Acquiring CSI at the interrogating device, however, may involve feedback from the EH-capable device based on CSI reference signals (CSI-RSs) or transmissions of sounding reference signals (SRSs), both of which are energy intensive at the EH-capable device.

Aspects of the disclosure relate to determination of CSI at the interrogating device based on measurements of backscattered signals reflected from the EH-capable device. For example, the described techniques relate to improved methods, systems, devices, and apparatuses that support two stage codebook beamforming for channel estimation in passive devices. The described techniques provide for improved channel estimation (e.g., CSI estimation) for passive devices, such as an EH-capable device. This may include a network node (e.g., a reader) transmitting a set of reference signals to an EH-capable device via a corresponding set of antennas. The antennas in the corresponding set of antennas may each be associated with a unique precoding vector (e.g., the precoding vector used for beamforming the reference signal). In some examples, each precoding vector may be or otherwise use a combinational codeword based on a combination of codewords from a set of available codewords. The EH-capable device may receive the reference signals and transmit a set of frequency-shifted backscatter responses that correspond to at least a subset of the set of reference signals. For example, the EH-capable device may receive a subset of the set of reference signals at a threshold input power level and backscatter the response(s), wherein the backscattering applies a frequency shift. The reader may receive the set of frequency-shifted backscatter responses and use this information to identify or otherwise determine the CSI for the wireless channel between the reader and the EH-capable device. Accordingly, the reader may transmit a signal to the EH-capable device based on the CSI. That is, the CSI may be based on the set of frequency-shifted backscatter responses.

Aspects of the disclosure are initially described in the context of wireless communications systems. Aspects of the disclosure are further illustrated by and described with reference to apparatus diagrams, system diagrams, and flowcharts that relate to two stage codebook beamforming for channel estimation in passive devices.

FIG. 1 shows an example of a wireless communications system 100 that supports two stage codebook beamforming for channel estimation in passive devices in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node. Components within a wireless communication system may be coupled (for example, operatively, communicatively, functionally, electronically, and/or electrically) to each other.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support two stage codebook beamforming for channel estimation in passive devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transactionbased business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IOT (also referred to as CAT NB1) UEs, as well as other types of UEs. eMTC and NB-IOT may refer to future technologies that may evolve from or may be based on these technologies. For example, eMTC may include FeMTC (further eMTC), eFeMTC (enhanced further eMTC), and mMTC (massive MTC), and NB-IOT may include eNB-IoT (enhanced NB-IOT), and FeNB-IOT (further enhanced NB-IOT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some low-cost and low-complexity devices are being proposed that implement RFID techniques for communications, for example, instead of or in addition to communications via a Uu, Wi-Fi, or PC5 interface. RFID techniques are low power communications, commonly relying on backscatter modulation. RFID techniques may be used in applications such as inventory/asset management, IoT, sustainable sensor networks in factories and/or agriculture, and smart home devices. In systems that use backscatter modulation, an interrogation signal from an interrogating device (e.g., a network node/RFID reader) is reflected back to the interrogating device (e.g., the reader) by the interrogated device (e.g., the RFID tag or EH-capable device) with information modulated on the reflected signal. In some aspects, an interrogating device (e.g., the reader) may be a network entity 105 or a UE 115 as described herein. In some aspects, an EH-capable device may be a UE 115 as described herein. An EH-capable device may consume relatively little power, as most (or all) of the energy used to backscatter communications is provided by the interrogating device. RFID devices may accordingly have low operating expenses, low maintenance demands, and long-life.

In some aspects, a network entity 105 may read and/or write information stored on a passive IoT device (e.g., an RFID tag or EH-capable device). The network entity 105 may provide energy to a passive or semi-passive IoT device, and an information bearing signal may be reflected to the network entity 105 via backscattering modulation. The network entity 105 may read the reflected signal (e.g., the backscatter response) from the IoT device and decode the information transmitted by the IoT devices.

Backscatter modulation supports a short range (e.g., less than 10 meters), as the power of the downlink signal (the interrogating signal) generally has to be sufficiently high to support energy-harvesting at the EH-capable device (e.g., more than −13 dBm). Additionally, multi-path reflections can cause fading and further decrease the range. To increase the received power of the interrogating signal at the EH-capable device, the reader may perform channel selection and/or spatial beamforming for the interrogating signal based on CSI. Acquiring CSI at the interrogating device, however, may involve feedback from the EH-capable device based on CSI-RSs or transmissions of SRSs, both of which are energy intensive at the EH-capable device.

In some aspects, the interrogating device may determine the CSI based on measurements of backscattered signals reflected from the EH-capable device. A network node (e.g., the interrogating device) with multiple antennas may indicate, to the EH-capable device, a frequency shift to be applied by the EH-capable device to backscattering. The network node may transmit reference signals from each antenna of the network node. The network node may transmit the reference signals using TDM, FDM, and/or CDM techniques. The EH-capable device may backscatter the received reference signals in accordance with the indicated frequency shift, and the network node may measure the frequency-shifted backscattered responses to the reference signals to determine CSI between the different antennas and the EH-capable device. Based on the identified CSI, the network node may perform channel selection and/or spatial beamforming to increase the received power at the EH-capable device for downlink transmissions to the EH-capable device.

A network node (e.g., the reader, which may be an example of a network entity 105 and/or a UE 115 and referred to as the interrogating device) may transmit a set of reference signals via a corresponding set of antennas, each antenna in the corresponding set of antennas associated with a unique precoding vector, wherein each precoding vector uses a combinational codeword based on a combination of codewords from a set of available codewords. The network node may receive, from an EH-capable device, a set of frequency-shifted backscatter responses corresponding to at least a subset of the set of reference signals. The network node may transmit, to the EH-capable device, a signal based on CSI, wherein the CSI is based on the set of frequency-shifted backscatter responses.

An EH-capable device (e.g., a passive device, which may be an example of a UE 115 and referred to as the interrogated device, RFID tag, etc.) may receive, from a network node, control information including an indication of a frequency shift to apply to backscatter modulation. The EH-capable device may receive, from the network node, a set of reference signals. The EH-capable device may backscatter a set of frequency-shifted backscatter responses corresponding to at least a subset of reference signals from the set of reference signals.

Figure 2:
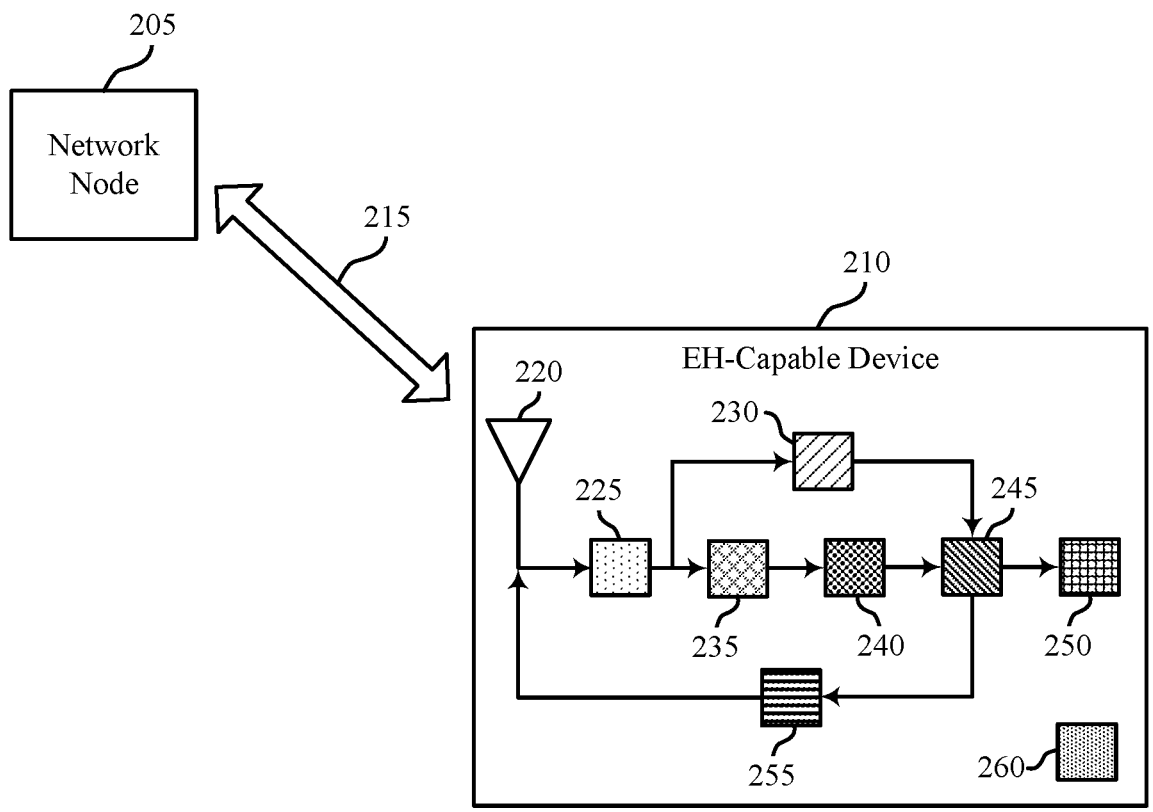
FIG. 2 shows an example of a wireless communications system that supports two stage codebook beamforming for channel estimation in passive devices in accordance with one or more aspects of the present disclosure.

FIG. 2 shows an example of a wireless communications system 200 that supports two stage codebook beamforming for channel estimation in passive devices in accordance with one or more aspects of the present disclosure. The wireless communications system 200 may implement or be implemented by aspects of the wireless communications system 100.

The wireless communications system 200 may include a network node 205 (e.g., a network entity 105 or a UE 115 as described with reference to FIG. 1) and an EH-capable device 210 (e.g., a UE 115 as described with reference to FIG. 1). The wireless communications system 200 may support communications between the network node 205 and the EH-capable device 210. For example, the network node 205 may communicate signals with the EH-capable device 210 over a communication link 215, which may be an example of a communication link 125 described with reference to FIG. 1.

The EH-capable device 210 may include various components to support the communication of signaling with the network node 205. For example, the EH-capable device 210 may include an antenna 220 that supports the reception of signals transmitted by the network node 205 and the transmission of signals (e.g., the backscattering of signals) to the network node 205. The EH-capable device 210 may also include an impedance matcher 225 (e.g., coupled with the antenna 220). The impedance matcher 225 may be a fixed or adjustable component that may set an impedance of a line from the antenna 220. Absorption or reflection of signals received at the antenna 220 may be based on an impedance of the impedance matcher.

The EH-capable device 210 may include a power harvester 235 that is operable to harvest energy from energy signals received from the network node 205. For example, energy signals received from the network node 205 may be routed to the power harvester 235, which may harvest energy from the energy signals to power one or more components of the EH-capable device 210. In some aspects, the EH-capable device 210 may include a regulator 240 that is operable to regulate the energy harvested by the power harvester 235. For example, the regulator 240 may regulate the energy to a voltage or a current that is compatible with the one or more components powered by the energy.

The EH-capable device 210 may include a demodulator 230 that is operable to demodulate signals received from the network node 205 and send the demodulated signals to a controller 245 included in the EH-capable device 210. In some aspects, the controller 245 may be an example of a microcontroller. The controller 245 may process the demodulated signals and perform one or more operations based on the information included in the demodulated signals. For example, the controller 245 may operate a sensor 250 or an actuator (e.g., the sensor 250 may include or be replaced with an actuator) included in (e.g., or coupled with, connected to) the EH-capable device 210 in accordance with the information. For instance, the controller 245 may activate the sensor 250, deactivate the sensor 250, read a measurement taken by the sensor 250, activate the actuator, deactivate the actuator, or a combination thereof, among other operations that the controller 245 may perform.

In some aspects, the controller 245 may send signaling to a modulator 255 that is to be transmitted to the network node 205. The modulator 255 may modulate the signaling in accordance with an MCS and send the modulated signaling to the antenna 220 for transmission. For example, the modulator 255 may modulate an energy signal based on determined CSI and send the modulated energy signal to the antenna 220 for transmission to the network node 205. Additionally, the modulator 255 may modulate identification information associated with the EH-capable device 210, data, information associated with operation of the EH-capable device 210, or information associated with the sensor 250 or the actuator, among other types of signaling that may be modulated by the modulator 255 and transmitted to the network node 205.

The wireless communications system 200 may support various types of EH-capable devices 210. For example, a first type of EH-capable device 210 may correspond to an EH-capable device 210 that excludes or is unconnected from a power source, such as a battery 260 (although other types of power sources are possible). Here, the components of the EH-capable device 210 may be powered by the energy harvested from energy signals received at the EH-capable device 210. A second type of EH-capable device 210 may correspond to an EH-capable device 210 that includes or is connected to a power source, such as the battery 260. Here, the components of the EH-capable device 210 may be powered by the energy harvested from energy signals, the battery 260, or a combination thereof. In some aspects, the power harvested from the energy signals may be used to charge the battery 260, which may increase a battery life of the battery 260 and reduce a frequency at which the battery 260 is replaced, among other benefits.

Figure 3:
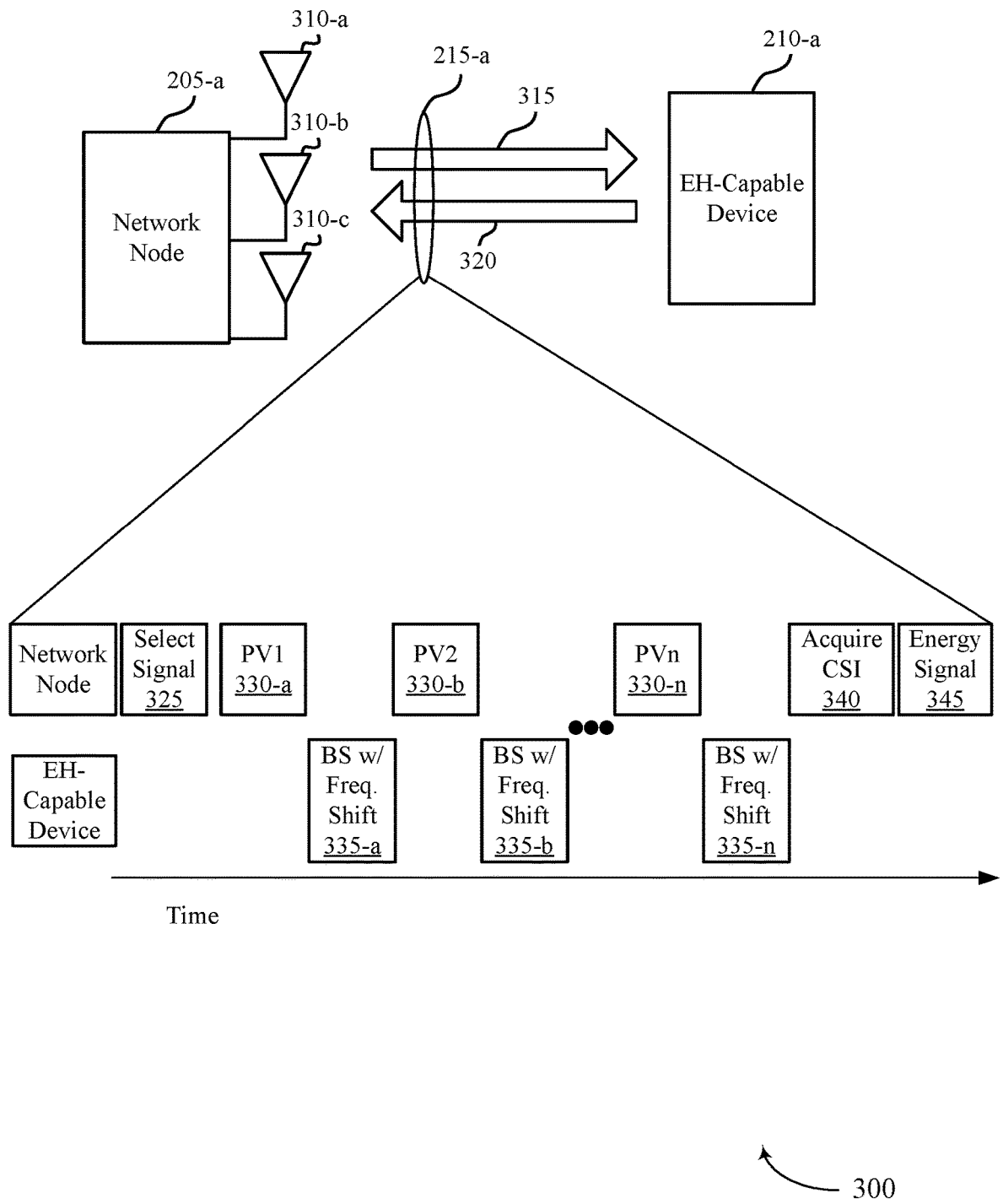
FIG. 3 shows an example of a wireless communications system that supports two stage codebook beamforming for channel estimation in passive devices in accordance with one or more aspects of the present disclosure.

FIG. 3 shows an example of a wireless communications system 300 that supports two stage codebook beamforming for channel estimation in passive devices in accordance with one or more aspects of the present disclosure. The wireless communications system 300 may implement or be implemented by aspects of the wireless communications system 100 or the wireless communications system 200, as described herein. For example, the wireless communications system 300 includes a network node 205-a and an EH-capable device 210-a, which may be examples of a network node 205 and an EH-capable device 210 as described herein.

The wireless communications system 300 may support communications between the network node 205-a and the EH-capable device 210-a. For example, the network node 205-a may communicate signals with the EH-capable device 210-a over a communication link 215-a, which may be an example of a communication link 215 described with reference to FIG. 2. For example, the network node 205-a may transmit signals 315 to the EH-capable device 210-a, and the EH-capable device 210-a may reflect backscattered responses 320 to the signals 315 using backscatter modulation.

The network node 205-a may include multiple antennas (e.g., a set of antennas including an antenna 310-a, an antenna 310-b, and an antenna 310-c). To increase the received power of the interrogating signals transmitted by the network node 205-a (e.g., the signals 315) at the EH-capable device 210-a, the network node 205-a may perform channel selection and/or spatial beamforming for the interrogating signal based on CSI between the antennas 310 of the network node 205-*a* and the EH-capable device 210-*a*. The network node 205-*a* may determine the CSI based on measurements of backscattered responses reflected from the EH-capable device 210-*a*.

The network node 205-*a* may transmit control information (e.g., a select signal 325) indicating a frequency shift for the EH-capable device 210-*a* to apply to backscattering. The select signal 325 may carry or otherwise convey identifier information, frequency shift information, and more, applied by the EH-capable device 210-*a*. The network node 205-*a* may transmit a set of reference signals 330 from the multiple antennas 310, and may receive the frequency-shifted backscatter responses 335 from the EH-capable device 210-*a*. Each, some, or all of the reference signals in the set of reference signals 330 transmitted by the network node 205-*a* may be transmitted according to a unique precoding vector (PV). The precoding vector may be based on a combinational codeword formed using a combination of codewords from a set of available codewords.

The precoding vector may be associated with beamforming the set of reference signals 330 transmitted by the network node 205-*a* transmitted to the EH-capable device 210-*a*. This may include the network node 205-*a* multiplying or otherwise applying a precoding vector to each transmitted reference signal in order to steer or direct the transmission in a specific direction. The beamformed set of reference signals 330 using the precoding vector may be transmitted in a sweeping manner (e.g., sweeping the reference signal transmissions in multiple directions towards the EH-capable device 210-*a*).

In some networks, the precoding vector applied to reference signal transmissions may be based on a codeword, such as a discrete Fourier transform (DFT) codeword. This may include the network node 205-*a* using a codeword from the DFT codebook to determine the precoding vector applied to a transmission.

Wireless communications system 200 may use DFT codeword combining when transmitting the set of reference signals 330 to the EH-capable device 210-*a*. For example, the network node 205-*a* may combine a first set of codewords from the DFT codebook to obtain a first combination of codewords to determine a first precoding vector (e.g., PV1) used when transmitting a first reference signal 330-*a*. The first combination of codewords may also be referred to as a first combinational codeword.

The network node 205-*a* may combine a second set of codewords from the DFT codebook to obtain a second combination of codewords to determine a second precoding vector (e.g., PV2) used when transmitting a second reference signal 330-*b*. The second combination of codewords may also be referred to as a second combinational codeword. The network node 205-*a* may continue to combine codewords from the DFT codebook to determine or otherwise obtain a unique combinational codeword for each reference signal transmission to the EH-capable device 210-*a*. That is, the network node 205-*a* may continue to transmit reference signals using combinational codewords and receive corresponding backscatter responses until transmitting a last reference signal 330-*n* and receiving a last corresponding frequency-shifted backscatter response 335-*n*. The frequency shift and reflecting coefficients applied by the EH-capable device 210-*a* may be the same through the backscatter responses.

The number of codewords to be included in the combinational codewords (e.g., the first and/or second set of codewords) may be based on previously received frequency-shifted backscatter responses. The precoding vector (e.g., p) used or otherwise applied by the network node 205-*a* may be the combination of codewords from the DFT codebook using $p=\Sigma_i c_i d_i$, wherein the combinational coefficient $c_i$ may be based on the backscattered signal(s) previously received at the network node 205-*a*. The combinational coefficient, $c_i$, may be selected such that the ratio of $c_i$ is proportional to the backscattered signals received for different codewords. The previously received backscattered signals may be based on a threshold (e.g., the backscattered signals may have been received at a threshold receive power level). That is, codewords for the previously received backscattered signals satisfying the threshold relative to a maximum gain may be selected for the combinational codeword used for transmitting the reference signals in the set of reference signals 330.

Accordingly, the network node 205-*a* may transmit the first reference signal 330-*a* (e.g., based on a first precoding vector using a first combinational codeword) and may receive a corresponding first frequency-shifted backscatter response 335-*a*. The network node 205-*a* may transmit the second reference signal 330-*b* (e.g., based on a second precoding vector using a second combinational codeword) and receive a corresponding second frequency-shifted backscatter response 335-*b*. The network node 205-*a* may continue to transmit reference signals using combinational codewords and receive corresponding backscatter responses until transmitting the last reference signal 330-*n* and receiving a last corresponding frequency-shifted backscatter response 335-*n*. The same frequency shift may be applied by the EH-capable device 210-*a* for the frequency-shifted backscatter responses.

At 340, after reception of the frequency-shifted backscatter responses 335, the network node 205-*a* may estimate the CSI between the antennas 310 of the network node 205-*a* and the EH-capable device 210-*a* based on the transmitted set of reference signals 330 and the frequency-shifted backscatter responses 335. The network node 205-*a* may identify a subset of the precoding vector to use for subsequent transmissions to the EH-capable device 210-*a* based on the frequency-shifted backscatter responses 335. The network node 205-*a* may subsequently transmit a signal 345 to the EH-capable device 210-*a* using channel selection and/or spatial beamforming based on the determined CSI.

Figure 4:
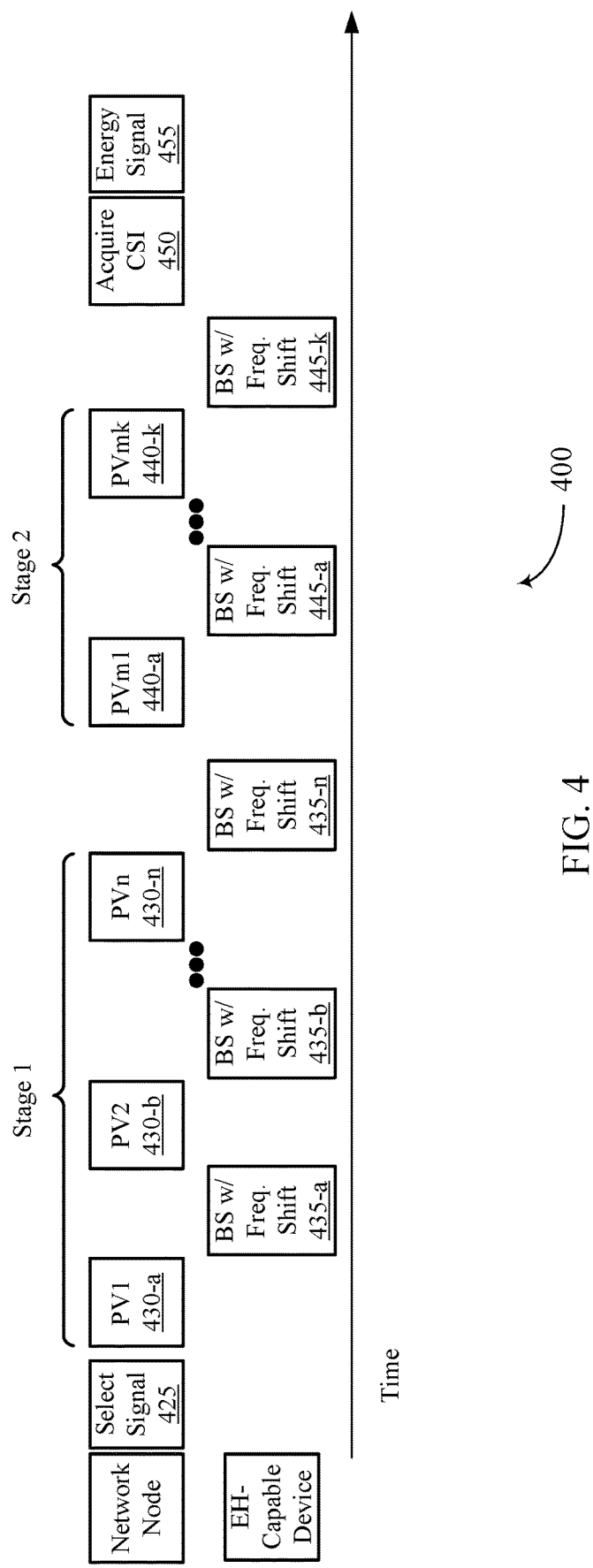
FIG. 4 shows an example of a two stage process that supports two stage codebook beamforming for channel estimation in passive devices in accordance with one or more aspects of the present disclosure.

FIG. 4 shows an example of a two stage process 400 that supports two stage codebook beamforming for channel estimation in passive devices in accordance with one or more aspects of the present disclosure. The two stage process 400 may implement or be implemented by aspects of the wireless communications system 100 or the wireless communications system 200 or wireless communications system 300, as described herein. For example, aspects of the two stage process 400 may be implemented at or implemented by a network node and an EH-capable device, which may be examples the corresponding devices described herein.

As discussed above, the techniques described herein provide for the network node to transmit or otherwise provide a set of reference signals 430 to an EH-capable device. The network node may transmit control information (e.g., a select signal 425) indicating a frequency shift for the EH-capable device to apply to backscattering. The network node may transmit a set of reference signals 430 from the multiple antennas, and may receive the frequency-shifted backscatter responses 435 from the EH-capable device. Each, some, or all of the reference signals in the set of reference signals 430 transmitted by the network node may be transmitted according to a unique precoding vector (PV). The precoding vector may be based on a combinational codeword formed using a combination of codewords from a set of available codewords.

This may include the use of DFT codeword combining when transmitting the set of reference signals 430 to the EH-capable device. For example, the network node may combine a first set of codewords from the DFT codebook to obtain a first combination of codewords to determine a first precoding vector (e.g., PV1) used when transmitting a first reference signal 430-a. The first combination of codewords may also be referred to as a first combinational codeword. The network node may receive a frequency-shifted backscatter response 435-a associated with the first reference signal 430-a from the EH-capable device. The network node may combine a second set of codewords from the DFT codebook to obtain a second combination of codewords to determine a second precoding vector (e.g., PV2) used when transmitting a second reference signal 430-b. The second combination of codewords may also be referred to as a second combinational codeword. The network node may continue to combine codewords from the DFT codebook to determine or otherwise obtain a unique combinational codeword for each reference signal transmission to the EH-capable device. That is, the network node may continue to transmit reference signals using combinational codewords and receive corresponding backscatter responses until transmitting a last reference signal 430-n and receiving a last corresponding frequency-shifted backscatter response 435-n. The frequency shift and reflecting coefficients applied by the EH-capable device may be the same through the backscatter responses.

Two stage process 400 illustrates a non-limiting example of the network node using the frequency-shifted backscatter responses 435 during an additional stage (e.g., a second stage) to improve channel estimation. Based on the frequency-shifted backscatter responses 435 received during the first stage, the network node may identify or otherwise determine the precoding vector(s) for energy transfer by combining multiple codewords. That is, the network node may identify a subset of the frequency-shifted backscatter responses that satisfy a threshold (e.g., such as a receive power threshold). The network node may use the subset of frequency-shifted backscatter responses to perform a second stage reference signal transmission to further improve CSI estimation. This may include the network node using the subset of frequency-shifted backscatter responses to the EH-capable device using updated precoding vectors. The updated precoding vectors may be based on combinational codewords, where the combinational codewords use the same combination or an updated combination of codewords selected based on the frequency-shifted backscatter responses 435 received during the first stage.

The second stage may include the network node combining an updated first set of codewords from the DFT codebook to obtain an updated first combination of codewords to determine an updated first precoding vector (e.g., PVm1) used when transmitting a first reference signal 440-a to the EH-capable device. The network node may continue to combine codewords from the DFT codebook to determine or otherwise obtain a unique and updated combinational codeword for each reference signal transmission to the EH-capable device. That is, the network node may continue to transmit reference signals using combinational codewords and receive corresponding backscatter responses until transmitting a last reference signal 440-k and receiving a last corresponding frequency-shifted backscatter response 445-k.

In some examples, the network node may vary the frequency (e.g., change the transmission frequency) of the second set of reference signals 440 transmitted during the second stage to improve channel estimation. That is, the transmission frequency used for transmitting the first set of reference signals 430 may change or be varied relative to the transmission frequency used for transmitting the second set of reference signals 440 during the second stage.

The second stage procedures may be repeated one or more times to provide further improvements to the channel estimation. For example, the network node may perform multiple transmissions of the second set of reference signals 440. In some examples, each repetition (e.g., each stage) may further refine the combinational codewords used for the precoding vector determination for the reference signal transmission.

At 450, after reception of the frequency-shifted backscatter responses 435 and the frequency-shifted backscatter responses 445, the network node may estimate the CSI between the antennas of the network node and the EH-capable device based on the transmitted set of reference signals 430 and the transmitted second set of reference signals 440. The network node may identify a subset of the precoding vector to use for subsequent transmissions to the EH-capable device based on the frequency-shifted backscatter responses. The network node may subsequently transmit a signal 455 to the EH-capable device using channel selection and/or spatial beamforming based on the determined CSI.

Figure 5:
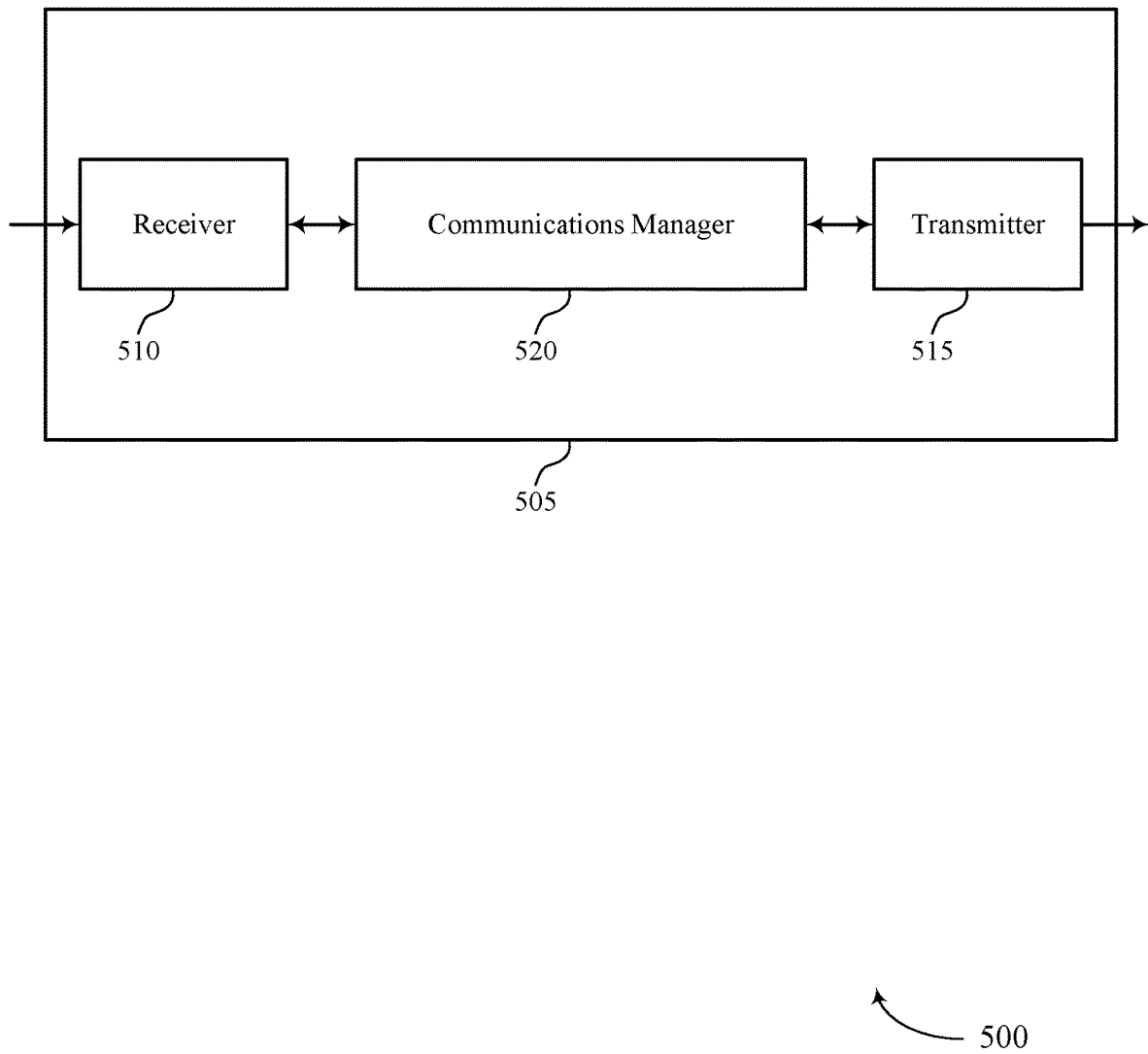
FIGS. 5 and 6 show block diagrams of devices that support two stage codebook beamforming for channel estimation in passive devices in accordance with one or more aspects of the present disclosure.

FIG. 5 shows a block diagram 500 of a device 505 that supports two stage codebook beamforming for channel estimation in passive devices in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of two stage codebook beamforming for channel estimation in passive devices as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a CPU, a GPU, an ASIC, a FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a network node in accordance with examples as disclosed herein. For example, the communications manager 520 is capable of, configured to, or operable to support a means for transmitting a set of reference signals via a corresponding set of antennas, each antenna in the corresponding set of antennas associated with a unique precoding vector, where each precoding vector uses a combinational codeword based on a combination of codewords from a set of available codewords. The communications manager 520 is capable of, configured to, or operable to support a means for receiving, from an EH-capable device, a set of frequency-shifted backscatter responses corresponding to at least a subset of the set of reference signals. The communications manager 520 is capable of, configured to, or operable to support a means for transmitting, to the EH-capable device, a signal based on CSI, where the CSI is based on the set of frequency-shifted backscatter responses.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for improved channel estimation techniques using combinational codeword-based precoding vectors applied to reference signal transmissions to an EH-capable device.

Figure 6:
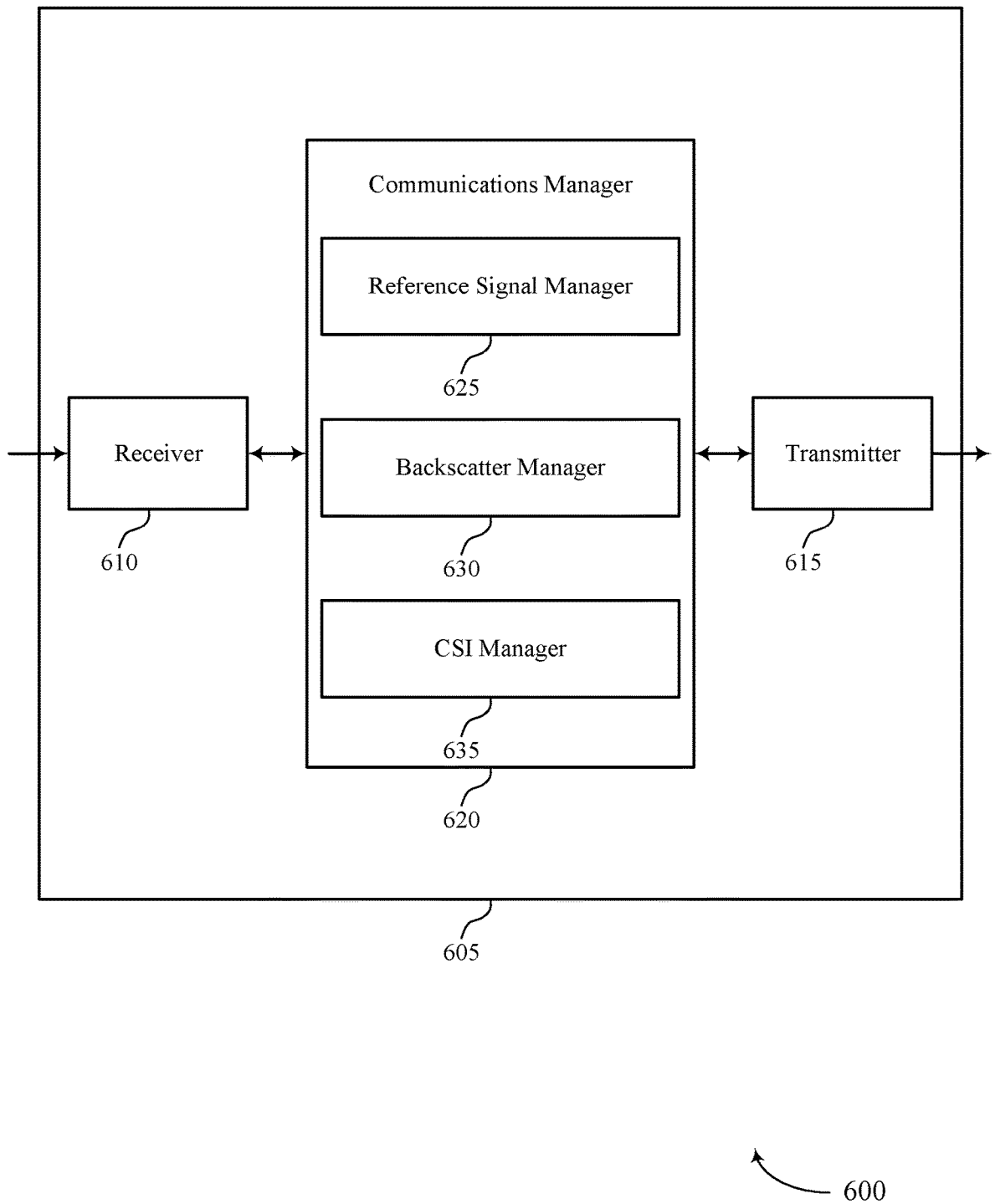

FIG. 6 shows a block diagram 600 of a device 605 that supports two stage codebook beamforming for channel estimation in passive devices in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of two stage codebook beamforming for channel estimation in passive devices as described herein. For example, the communications manager 620 may include a reference signal manager 625, a backscatter manager 630, a CSI manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a network node in accordance with examples as disclosed herein. The reference signal manager 625 is capable of, configured to, or operable to support a means for transmitting a set of reference signals via a corresponding set of antennas, each antenna in the corresponding set of antennas associated with a unique precoding vector, where each precoding vector uses a combinational codeword based on a combination of codewords from a set of available codewords. The backscatter manager 630 is capable of, configured to, or operable to support a means for receiving, from an EH-capable device, a set of frequency-shifted backscatter responses corresponding to at least a subset of the set of reference signals. The CSI manager 635 is capable of, configured to, or operable to support a means for transmitting, to the EH-capable device, a signal based on CSI, where the CSI is based on the set of frequency-shifted backscatter responses.

Figure 7:
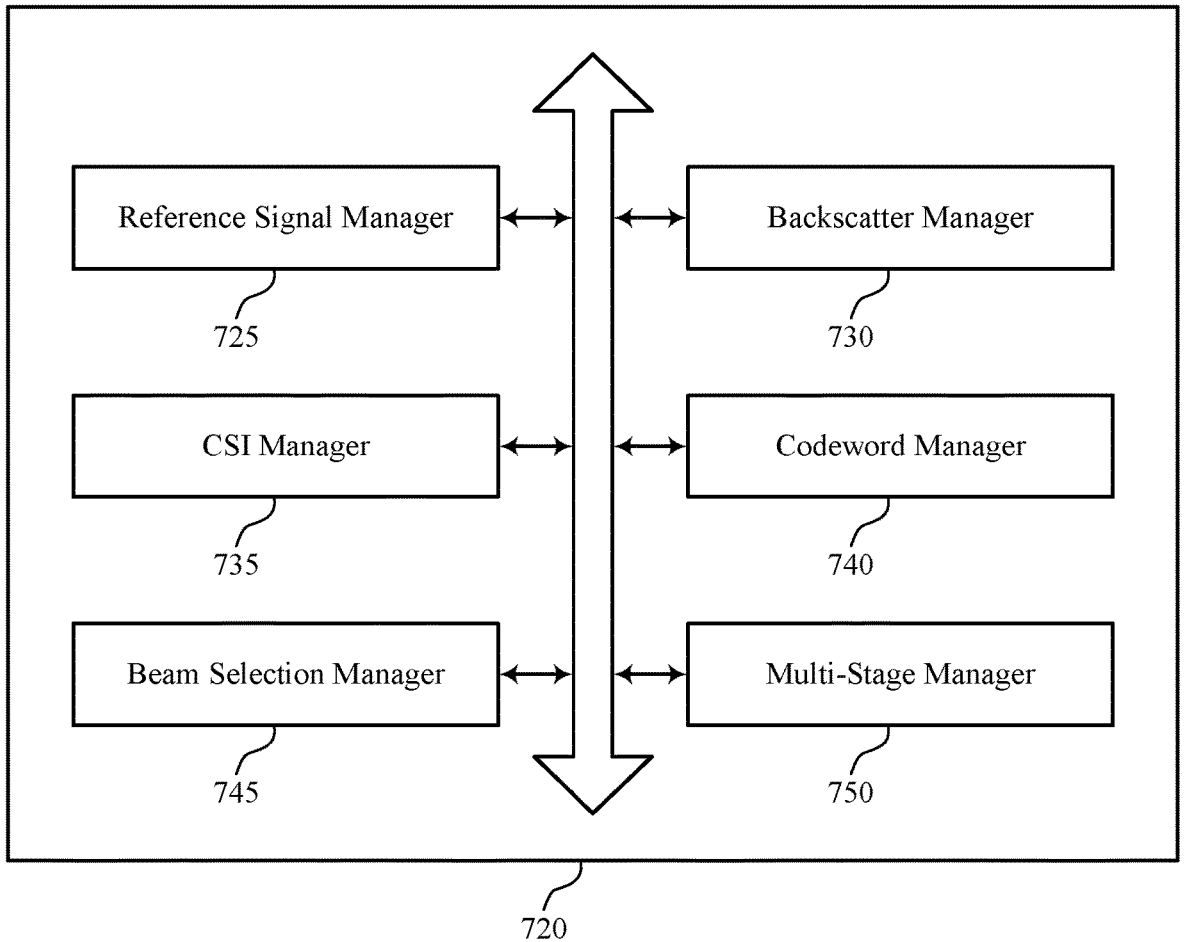
FIG. 7 shows a block diagram of a communications manager that supports two stage codebook beamforming for channel estimation in passive devices in accordance with one or more aspects of the present disclosure.

FIG. 7 shows a block diagram 700 of a communications manager 720 that supports two stage codebook beamforming for channel estimation in passive devices in accordance with one or more aspects of the present disclosure. The communications manager 720 may be an example of aspects of a communications manager 520, a communications manager 620, or both, as described herein. The communications manager 720, or various components thereof, may be an example of means for performing various aspects of two stage codebook beamforming for channel estimation in passive devices as described herein. For example, the communications manager 720 may include a reference signal manager 725, a backscatter manager 730, a CSI manager 735, a codeword manager 740, a beam selection manager 745, a multi-stage manager 750, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications at a network node in accordance with examples as disclosed herein. The reference signal manager 725 is capable of, configured to, or operable to support a means for transmitting a set of reference signals via a corresponding set of antennas, each antenna in the corresponding set of antennas associated with a unique precoding vector, where each precoding vector uses a combinational codeword based on a combination of codewords from a set of available codewords. The backscatter manager 730 is capable of, configured to, or operable to support a means for receiving, from an EH-capable device, a set of frequency-shifted backscatter responses corresponding to at least a subset of the set of reference signals. The CSI manager 735 is capable of, configured to, or operable to support a means for transmitting, to the EH-capable device, a signal based on CSI, where the CSI is based on the set of frequency-shifted backscatter responses.

In some examples, the codeword manager 740 is capable of, configured to, or operable to support a means for combining a first set of codewords from a DFT codebook to obtain a first combination of codewords to determine a first precoding vector used when transmitting a first reference signal in the set of reference signals, where the DFT codebook includes the set of available codewords. In some examples, the codeword manager 740 is capable of, configured to, or operable to support a means for combining a second set of codewords from the DFT codebook to obtain a second combination of codewords to determine a second precoding vector used when transmitting a second reference signal in the set of reference signals, where the first set of codewords and the second set of codewords include one or more different codewords.

In some examples, the codeword manager 740 is capable of, configured to, or operable to support a means for determining a number of codewords to be included in the first set of codewords, the second set of codewords, or both, based on a previously received set of frequency-shifted backscatter responses. In some examples, the number of codewords are determined based on previously received set of frequency-shifted backscatter responses and the number of codewords satisfying a threshold.

In some examples, the beam selection manager 745 is capable of, configured to, or operable to support a means for identifying, based on the set of frequency-shifted backscatter responses, a subset of precoding vectors to use for subsequent transmissions to the EH-capable device.

In some examples, the multi-stage manager 750 is capable of, configured to, or operable to support a means for identifying a subset of frequency-shifted backscatter responses from the set of frequency-shifted backscatter responses that satisfy a threshold. In some examples, the multi-stage manager 750 is capable of, configured to, or operable to support a means for transmitting, based on the subset of frequency-shifted backscatter responses, a second set of reference signals via a corresponding subset of antennas in the corresponding set of antennas.

In some examples, the multi-stage manager 750 is capable of, configured to, or operable to support a means for changing a transmission frequency for the second set of reference signals relative to the set of reference signals. In some examples, the multi-stage manager 750 is capable of, configured to, or operable to support a means for performing multiple transmissions of the second set of reference signals via the corresponding subset of antennas. In some examples, each antenna in the subset of antennas is associated with the precoding vector used during transmission of the set of reference signals or with an updated precoding vector different from the precoding vector. In some examples, the updated precoding vector is based on the threshold.

In some examples, the CSI manager 735 is capable of, configured to, or operable to support a means for determining the CSI based on a subset of the frequency-shifted backscatter responses from the set of frequency-shifted backscatter responses.

In some examples, the reference signal manager 725 is capable of, configured to, or operable to support a means for TDM, FDM, CDM, or a combination thereof, the reference signals in the set of reference signals.

In some examples, the CSI manager 735 is capable of, configured to, or operable to support a means for selecting a precoding vector to use to transmit the signal based on the set of frequency-shifted backscatter responses.

Figure 8:
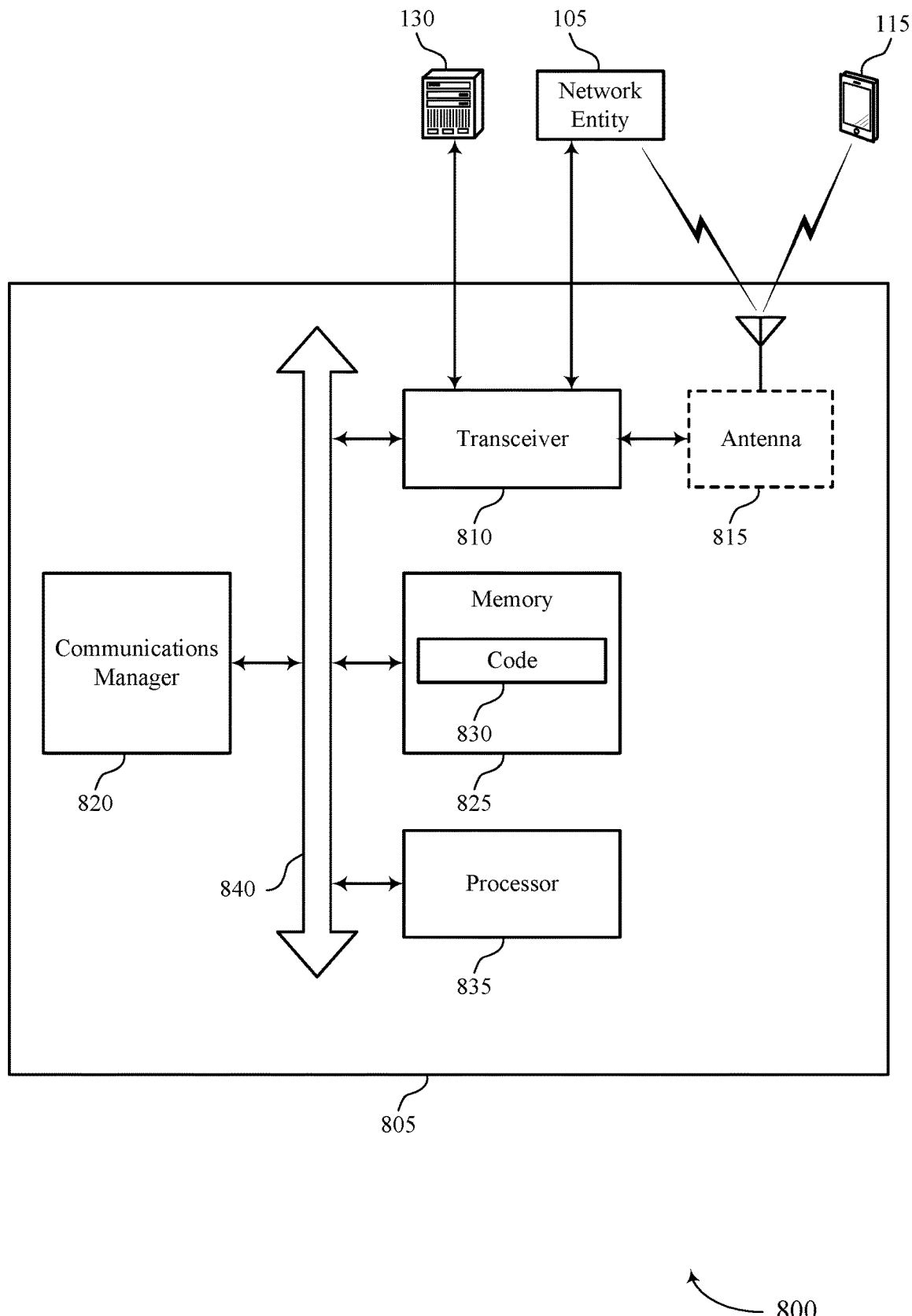
FIG. 8 shows a diagram of a system including a device that supports two stage codebook beamforming for channel estimation in passive devices in accordance with one or more aspects of the present disclosure.

FIG. 8 shows a diagram of a system 800 including a device 805 that supports two stage codebook beamforming for channel estimation in passive devices in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (for example, the processor 835, or the memory 825, or both), may be included in a chip or chip assembly that is installed in the device 805. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting two stage codebook beamforming for channel estimation in passive devices). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or sub-components of the device 805, such as the processor 835, or the transceiver 810, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communications at a network node in accordance with examples as disclosed herein. For example, the communications manager 820 is capable of, configured to, or operable to support a means for transmitting a set of reference signals via a corresponding set of antennas, each antenna in the corresponding set of antennas associated with a unique precoding vector, where each precoding vector uses a combinational codeword based on a combination of codewords from a set of available codewords. The communications manager 820 is capable of, configured to, or operable to support a means for receiving, from an EH-capable device, a set of frequency-shifted backscatter responses corresponding to at least a subset of the set of reference signals. The communications manager 820 is capable of, configured to, or operable to support a means for transmitting, to the EH-capable device, a signal based on CSI, where the CSI is based on the set of frequency-shifted backscatter responses.

By including or configuring the communications manager 820 in accordance with examples as described herein, the device 805 may support techniques for improved channel estimation techniques using combinational codeword-based precoding vectors applied to reference signal transmissions to an EH-capable device.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 (e.g., directly, indirectly, after precoding, without pre-processing) to cause the device 805 to perform various aspects of two stage codebook beamforming for channel estimation in passive devices as described herein, or the processor 835 and the memory 825 may be otherwise configured to perform or support such operations.

Figure 9:
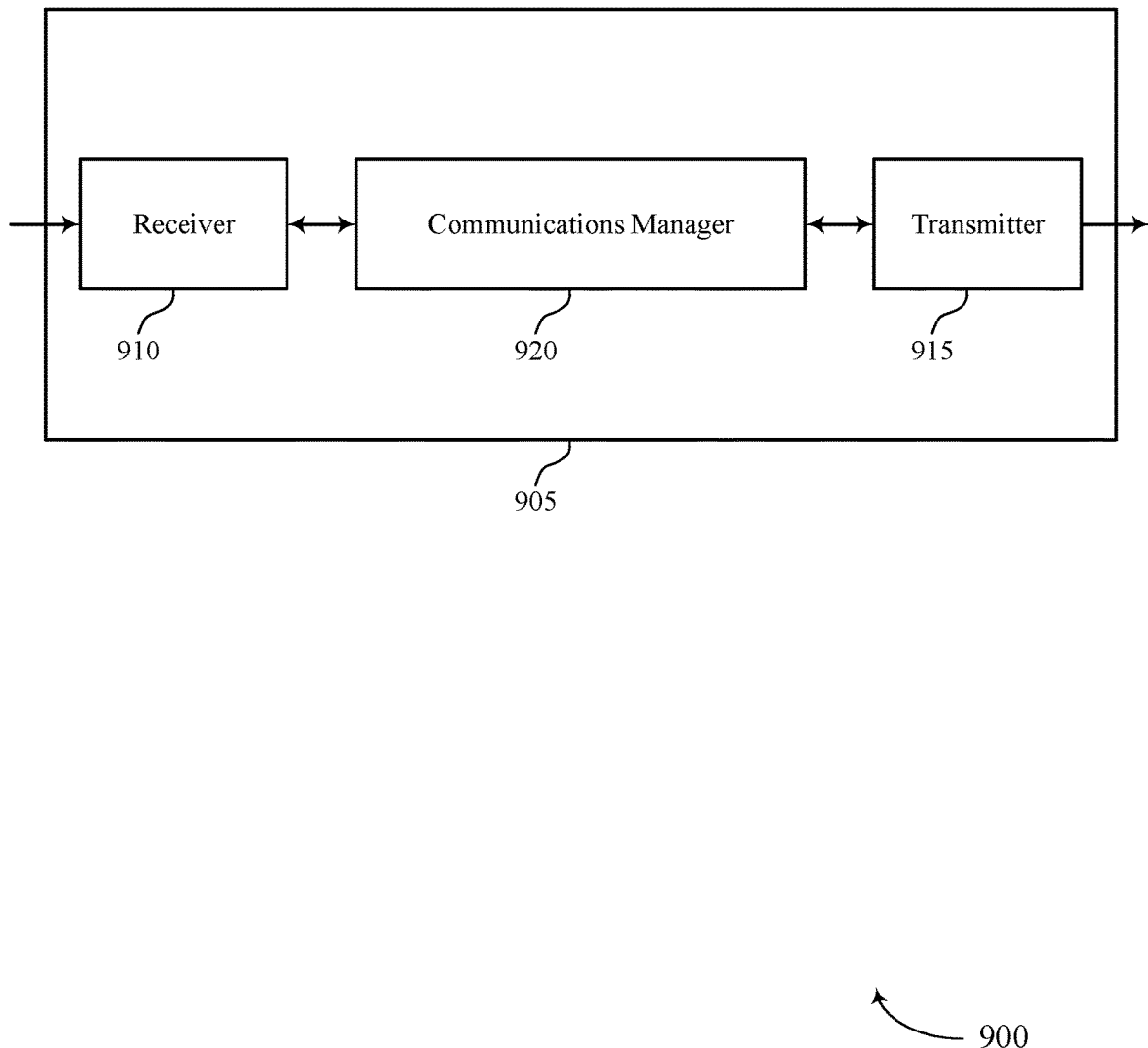
FIGS. 9 and 10 show block diagrams of devices that support two stage codebook beamforming for channel estimation in passive devices in accordance with one or more aspects of the present disclosure.

FIG. 9 shows a block diagram 900 of a device 905 that supports two stage codebook beamforming for channel estimation in passive devices in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to two stage codebook beamforming for channel estimation in passive devices). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to two stage codebook beamforming for channel estimation in passive devices). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of two stage codebook beamforming for channel estimation in passive devices as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at an energy harvesting (EH)-capable device in accordance with examples as disclosed herein. For example, the communications manager 920 is capable of, configured to, or operable to support a means for receiving, from a network node, control information including an indication of a frequency shift to apply to backscatter modulation. The communications manager 920 is capable of, configured to, or operable to support a means for receiving, from the network node, a set of reference signals. The communications manager 920 is capable of, configured to, or operable to support a means for backscattering a set of frequency-shifted backscatter responses corresponding to at least a subset of reference signals from the set of reference signals.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for improved channel estimation techniques using combinational codeword-based precoding vectors applied to reference signal transmissions to an EH-capable device.

Figure 10:
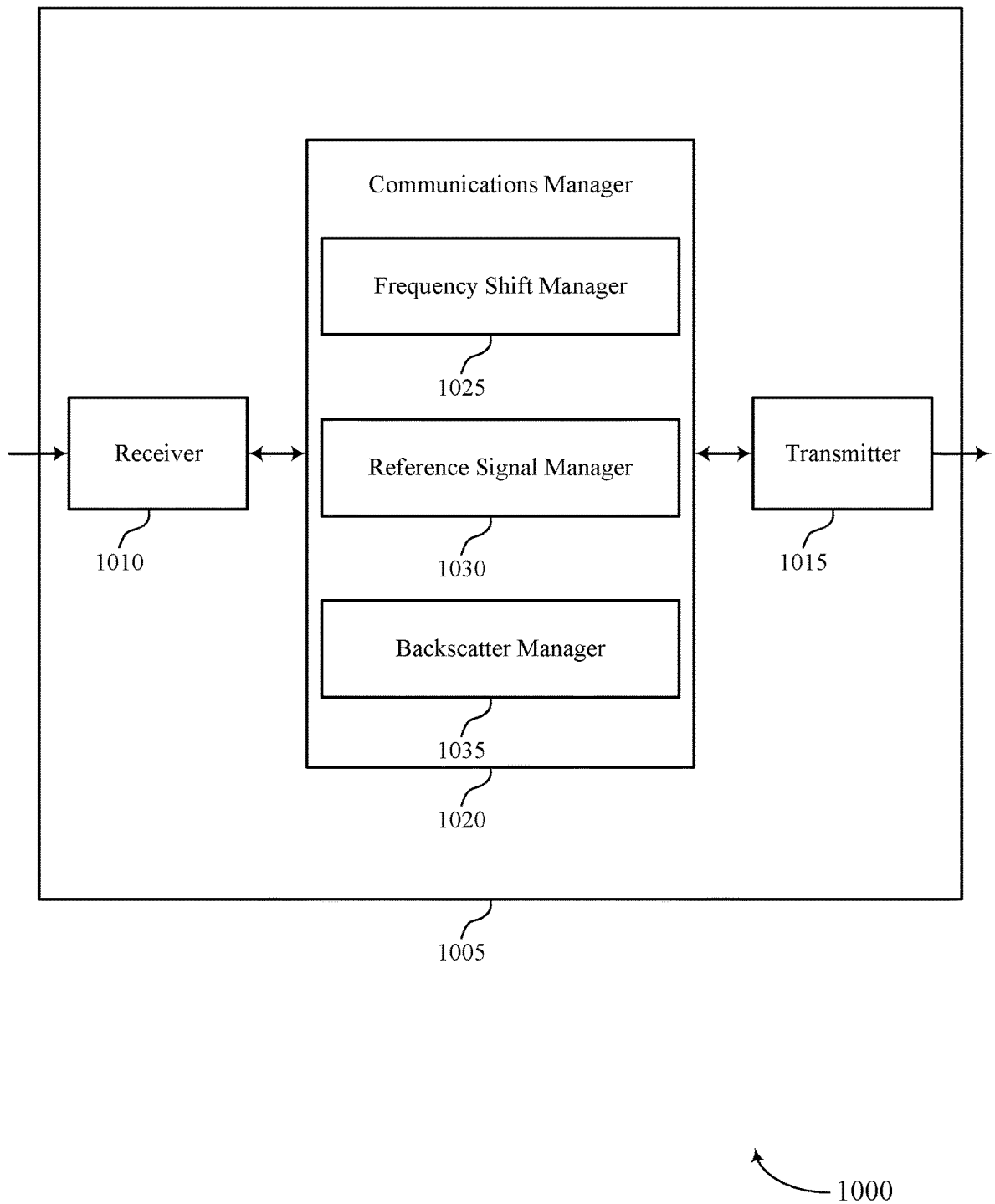

FIG. 10 shows a block diagram 1000 of a device 1005 that supports two stage codebook beamforming for channel estimation in passive devices in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to two stage codebook beamforming for channel estimation in passive devices). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to two stage codebook beamforming for channel estimation in passive devices). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of two stage codebook beamforming for channel estimation in passive devices as described herein. For example, the communications manager 1020 may include a frequency shift manager 1025, a reference signal manager 1030, a backscatter manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at an EH-capable device in accordance with examples as disclosed herein. The frequency shift manager 1025 is capable of, configured to, or operable to support a means for receiving, from a network node, control information including an indication of a frequency shift to apply to backscatter modulation. The reference signal manager 1030 is capable of, configured to, or operable to support a means for receiving, from the network node, a set of reference signals. The backscatter manager 1035 is capable of, configured to, or operable to support a means for backscattering a set of frequency-shifted backscatter responses corresponding to at least a subset of reference signals from the set of reference signals.

Figure 11:
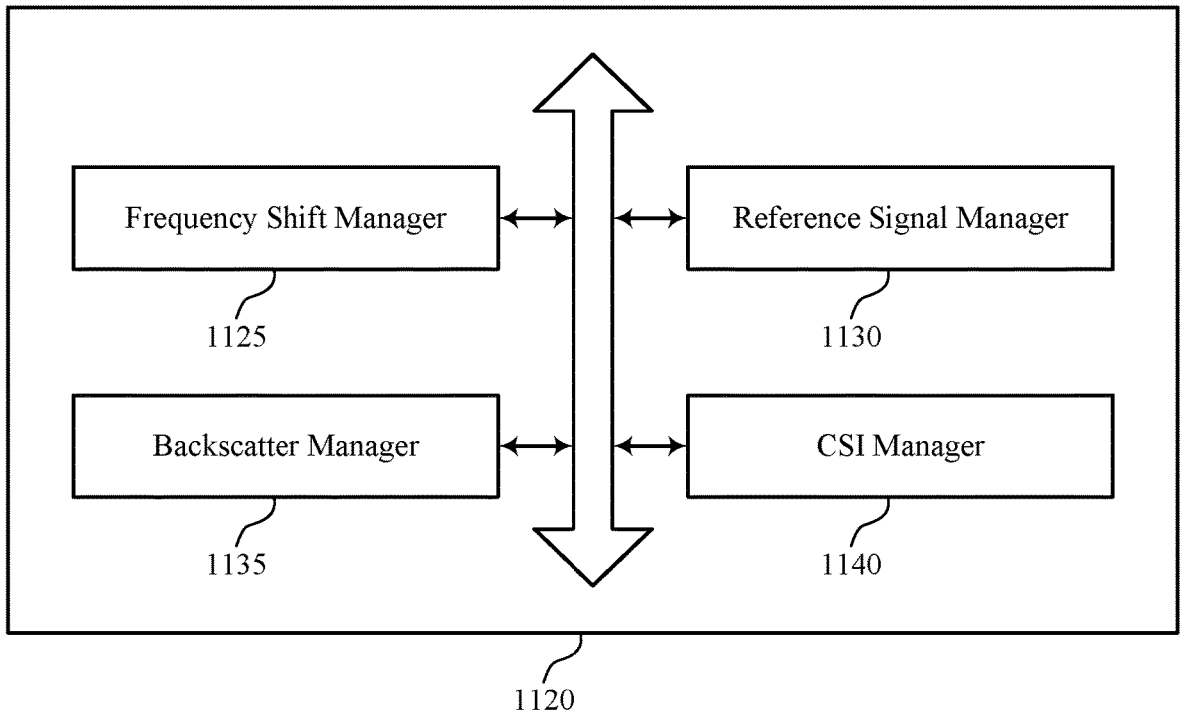
FIG. 11 shows a block diagram of a communications manager that supports two stage codebook beamforming for channel estimation in passive devices in accordance with one or more aspects of the present disclosure.

FIG. 11 shows a block diagram 1100 of a communications manager 1120 that supports two stage codebook beamforming for channel estimation in passive devices in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of two stage codebook beamforming for channel estimation in passive devices as described herein. For example, the communications manager 1120 may include a frequency shift manager 1125, a reference signal manager 1130, a backscatter manager 1135, a CSI manager 1140, or any combination thereof. Each of these components may communicate, directly or indirectly, with one another (e.g., via one or more buses).

The communications manager 1120 may support wireless communications at an EH-capable device in accordance with examples as disclosed herein. The frequency shift manager 1125 is capable of, configured to, or operable to support a means for receiving, from a network node, control information including an indication of a frequency shift to apply to backscatter modulation. The reference signal manager 1130 is capable of, configured to, or operable to support a means for receiving, from the network node, a set of reference signals. The backscatter manager 1135 is capable of, configured to, or operable to support a means for backscattering a set of frequency-shifted backscatter responses corresponding to at least a subset of reference signals from the set of reference signals. In some examples, the control information indicates a same frequency shift to apply to the reference signals in the set of reference signals. In some examples, the control information includes an identifier for the EH-capable device. In some examples, the control information includes an indication to apply a same reflection coefficient to the set of reference signals.

In some examples, the CSI manager 1140 is capable of, configured to, or operable to support a means for receiving, from the network node, a signal based on the set of frequency-shifted backscatter responses.

Figure 12:
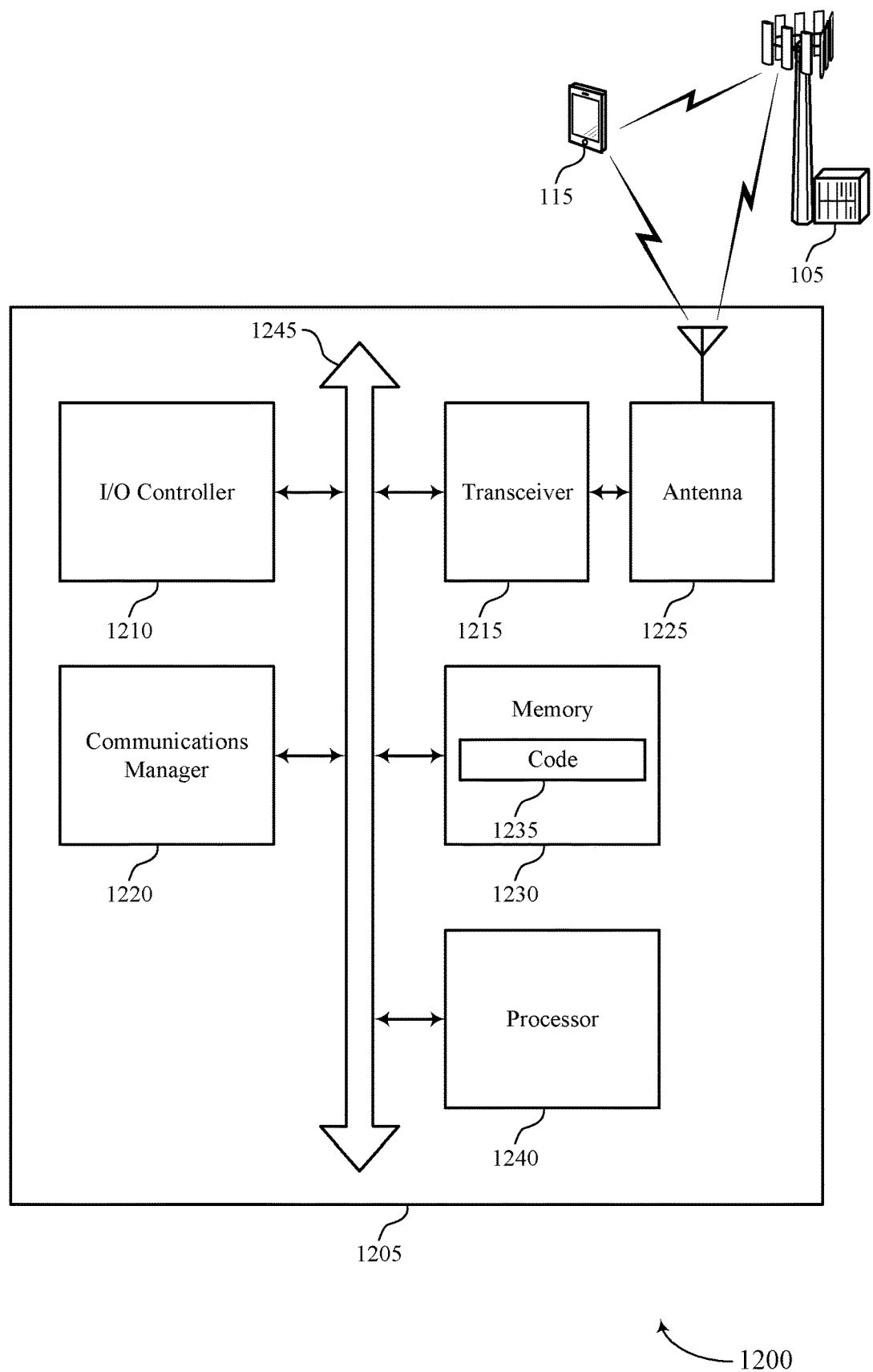
FIG. 12 shows a diagram of a system including a device that supports two stage codebook beamforming for channel estimation in passive devices in accordance with one or more aspects of the present disclosure.

FIG. 12 shows a diagram of a system 1200 including a device 1205 that supports two stage codebook beamforming for channel estimation in passive devices in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting two stage codebook beamforming for channel estimation in passive devices). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at an EH-capable device in accordance with examples as disclosed herein. For example, the communications manager 1220 is capable of, configured to, or operable to support a means for receiving, from a network node, control information including an indication of a frequency shift to apply to backscatter modulation. The communications manager 1220 is capable of, configured to, or operable to support a means for receiving, from the network node, a set of reference signals. The communications manager 1220 is capable of, configured to, or operable to support a means for backscattering a set of frequency-shifted backscatter responses corresponding to at least a subset of reference signals from the set of reference signals.

By including or configuring the communications manager 1220 in accordance with examples as described herein, the device 1205 may support techniques for improved channel estimation techniques using combinational codeword-based precoding vectors applied to reference signal transmissions to an EH-capable device.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 (e.g., directly, indirectly, after pre-coding, without pre-processing) to cause the device 1205 to perform various aspects of two stage codebook beamforming for channel estimation in passive devices as described herein, or the processor 1240 and the memory 1230 may be otherwise configured to perform or support such operations.

Figure 13:
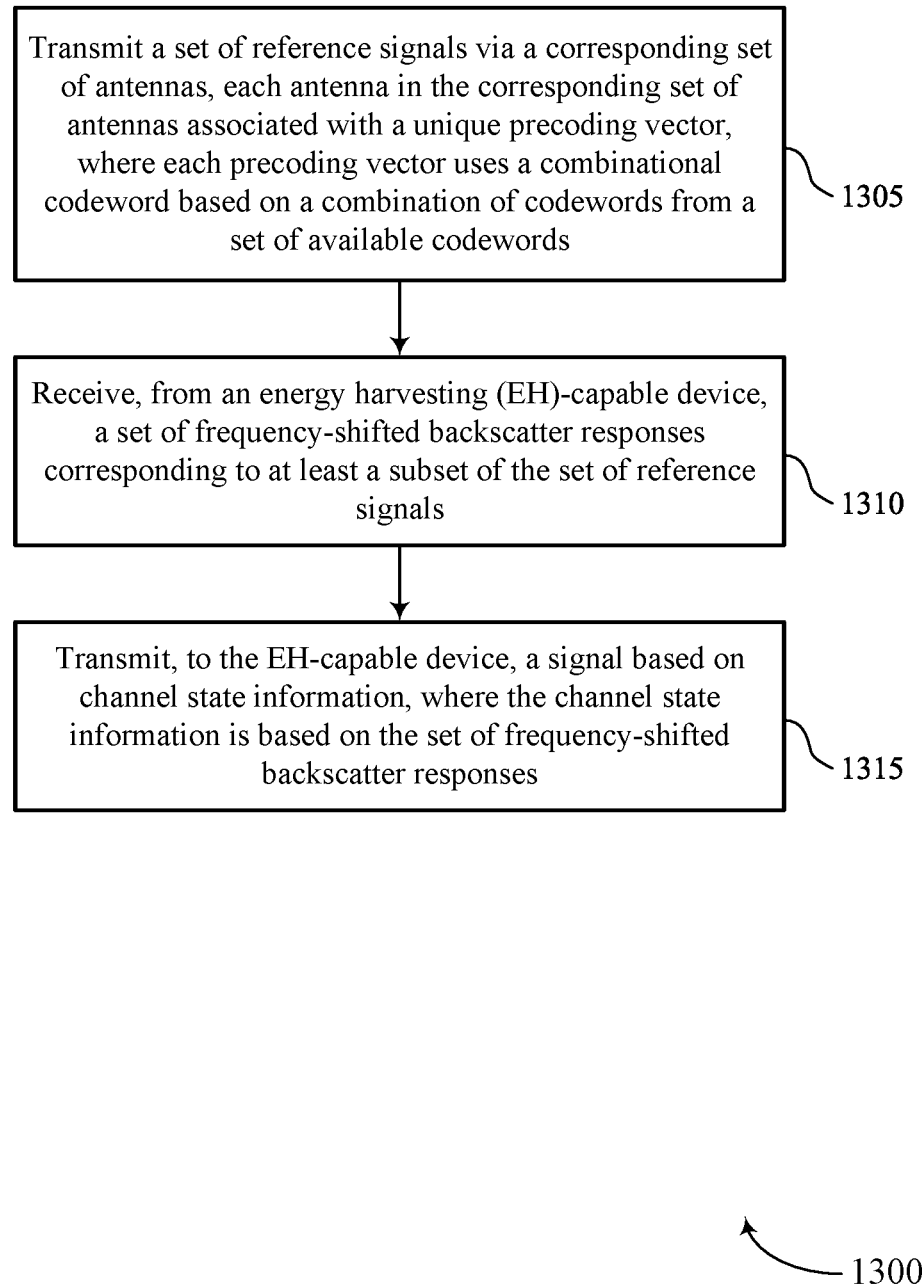
FIGS. 13 through 17 show flowcharts illustrating methods that support two stage codebook beamforming for channel estimation in passive devices in accordance with one or more aspects of the present disclosure.

FIG. 13 shows a flowchart illustrating a method 1300 that supports two stage codebook beamforming for channel estimation in passive devices in accordance with aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the wireless network entity to perform the described functions. Additionally, or alternatively, the wireless network entity may perform aspects of the described functions using special-purpose hardware.

At 1305, the method may include transmitting a set of reference signals via a corresponding set of antennas, each antenna in the corresponding set of antennas associated with a unique precoding vector, where each precoding vector uses a combinational codeword based on a combination of codewords from a set of available codewords. The operations of 1305 may be performed in accordance with examples as disclosed herein. In some examples, aspects of the operations of 1305 may be performed by a reference signal manager 725 as described with reference to FIG. 7.

At 1310, the method may include receiving, from an energy harvesting (EH)-capable device, a set of frequency-shifted backscatter responses corresponding to at least a subset of the set of reference signals. The operations of 1310 may be performed in accordance with examples as disclosed herein. In some examples, aspects of the operations of 1310 may be performed by a backscatter manager 730 as described with reference to FIG. 7.

At 1315, the method may include transmitting, to the EH-capable device, a signal based on CSI, where the CSI is based on the set of frequency-shifted backscatter responses. The operations of 1315 may be performed in accordance with examples as disclosed herein. In some examples, aspects of the operations of 1315 may be performed by a CSI manager 735 as described with reference to FIG. 7.

Figure 14:
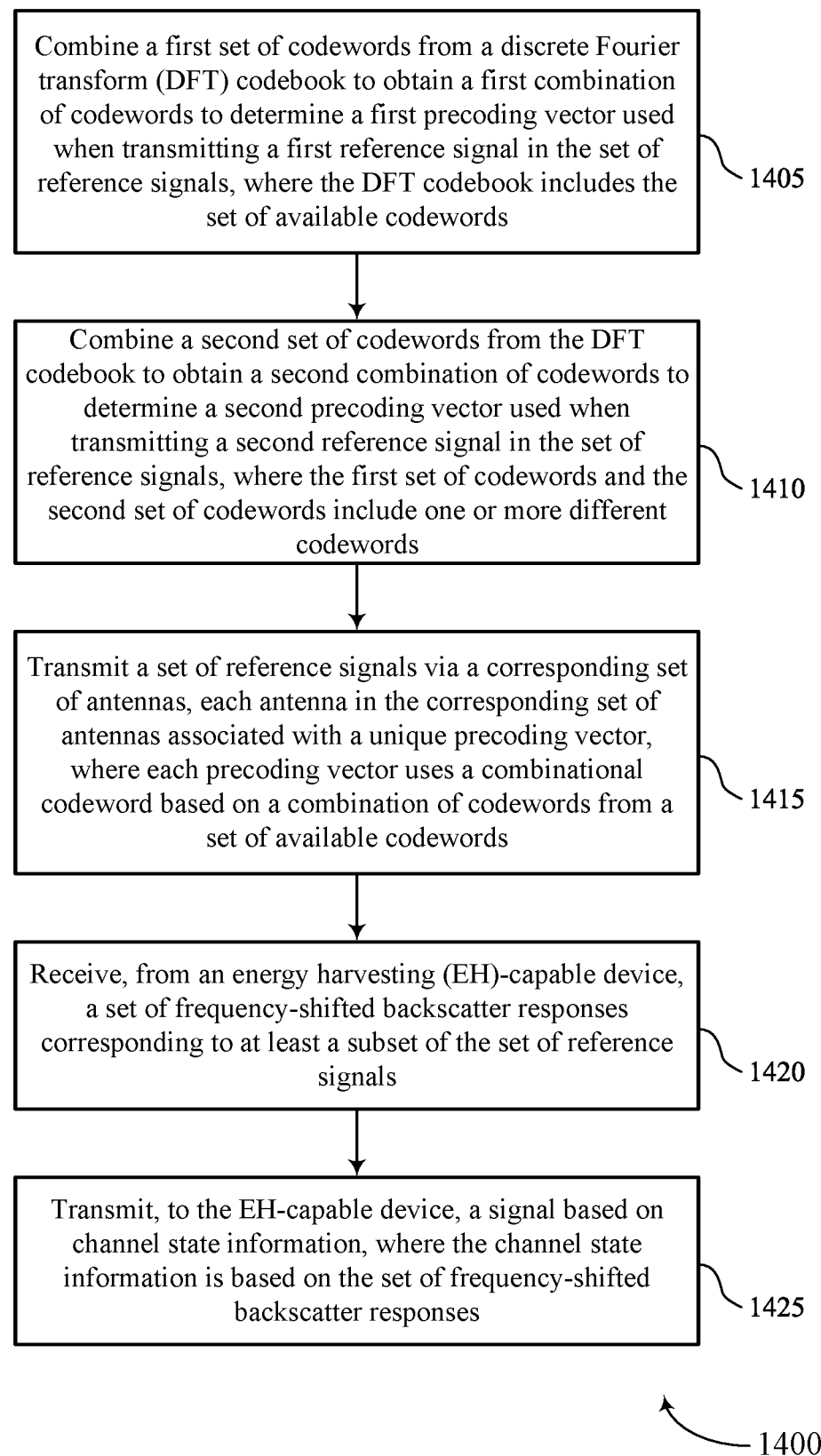

FIG. 14 shows a flowchart illustrating a method 1400 that supports two stage codebook beamforming for channel estimation in passive devices in accordance with aspects of the present disclosure. The operations of the method 1400 may be implemented by a network entity or its components as described herein. For example, the operations of the method 1400 may be performed by a network entity as described with reference to FIGS. 1 through 8. In some examples, a network entity may execute a set of instructions to control the functional elements of the wireless network entity to perform the described functions. Additionally, or alternatively, the wireless network entity may perform aspects of the described functions using special-purpose hardware.

At 1405, the method may include combining a first set of codewords from a discrete Fourier transform (DFT) codebook to obtain a first combination of codewords to determine a first precoding vector used when transmitting a first reference signal in the set of reference signals, where the DFT codebook includes the set of available codewords. The operations of 1405 may be performed in accordance with examples as disclosed herein. In some examples, aspects of the operations of 1405 may be performed by a codeword manager 740 as described with reference to FIG. 7.

At 1410, the method may include combining a second set of codewords from the DFT codebook to obtain a second combination of codewords to determine a second precoding vector used when transmitting a second reference signal in the set of reference signals, where the first set of codewords and the second set of codewords include one or more different codewords. The operations of 1410 may be performed in accordance with examples as disclosed herein. In some examples, aspects of the operations of 1410 may be performed by a codeword manager 740 as described with reference to FIG. 7.

At 1415, the method may include transmitting a set of reference signals via a corresponding set of antennas, each antenna in the corresponding set of antennas associated with a unique precoding vector, where each precoding vector uses a combinational codeword based on a combination of codewords from a set of available codewords. The operations of 1415 may be performed in accordance with examples as disclosed herein. In some examples, aspects of the operations of 1415 may be performed by a reference signal manager 725 as described with reference to FIG. 7.

At 1420, the method may include receiving, from an energy harvesting (EH)-capable device, a set of frequency-shifted backscatter responses corresponding to at least a subset of the set of reference signals. The operations of 1420 may be performed in accordance with examples as disclosed herein. In some examples, aspects of the operations of 1420 may be performed by a backscatter manager 730 as described with reference to FIG. 7.

At 1425, the method may include transmitting, to the EH-capable device, a signal based on CSI, where the CSI is based on the set of frequency-shifted backscatter responses. The operations of 1425 may be performed in accordance with examples as disclosed herein. In some examples, aspects of the operations of 1425 may be performed by a CSI manager 735 as described with reference to FIG. 7.

Figure 15:
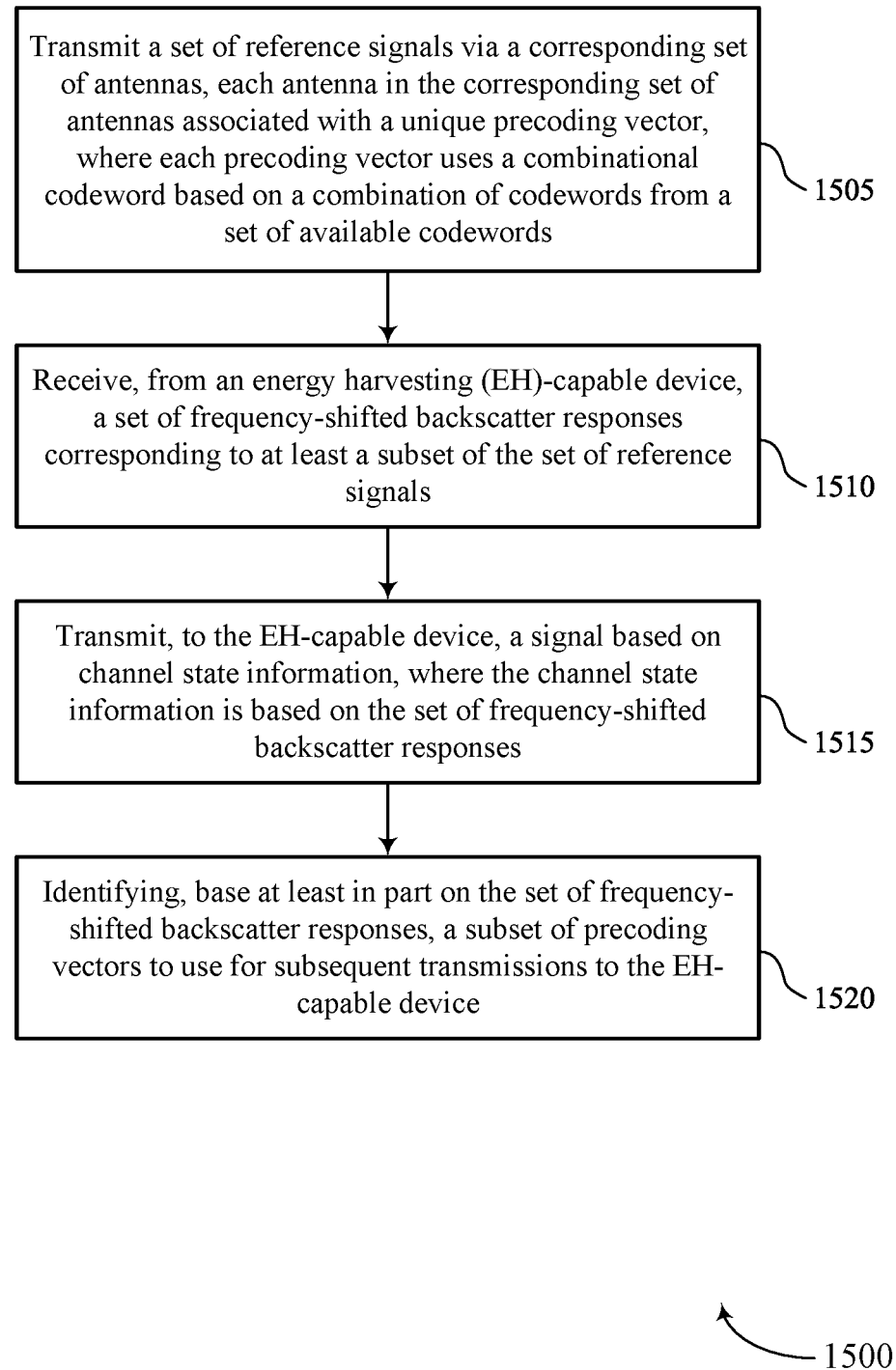

FIG. 15 shows a flowchart illustrating a method 1500 that supports two stage codebook beamforming for channel estimation in passive devices in accordance with aspects of the present disclosure. The operations of the method 1500 may be implemented by a network entity or its components as described herein. For example, the operations of the method 1500 may be performed by a network entity as described with reference to FIGS. 1 through 8. In some examples, a network entity may execute a set of instructions to control the functional elements of the wireless network entity to perform the described functions. Additionally, or alternatively, the wireless network entity may perform aspects of the described functions using special-purpose hardware.

At 1505, the method may include transmitting a set of reference signals via a corresponding set of antennas, each antenna in the corresponding set of antennas associated with a unique precoding vector, where each precoding vector uses a combinational codeword based on a combination of codewords from a set of available codewords. The operations of 1505 may be performed in accordance with examples as disclosed herein. In some examples, aspects of the operations of 1505 may be performed by a reference signal manager 725 as described with reference to FIG. 7.

At 1510, the method may include receiving, from an energy harvesting (EH)-capable device, a set of frequency-shifted backscatter responses corresponding to at least a subset of the set of reference signals. The operations of 1510 may be performed in accordance with examples as disclosed herein. In some examples, aspects of the operations of 1510 may be performed by a backscatter manager 730 as described with reference to FIG. 7.

At 1515, the method may include transmitting, to the EH-capable device, a signal based on CSI, where the CSI is based on the set of frequency-shifted backscatter responses. The operations of 1515 may be performed in accordance with examples as disclosed herein. In some examples, aspects of the operations of 1515 may be performed by a CSI manager 735 as described with reference to FIG. 7.

At 1520, the method may include identifying, based on the set of frequency-shifted backscatter responses, a subset of precoding vectors to use for subsequent transmissions to the EH-capable device. The operations of 1520 may be performed in accordance with examples as disclosed herein. In some examples, aspects of the operations of 1520 may be performed by a beam selection manager 745 as described with reference to FIG. 7.

Figure 16:
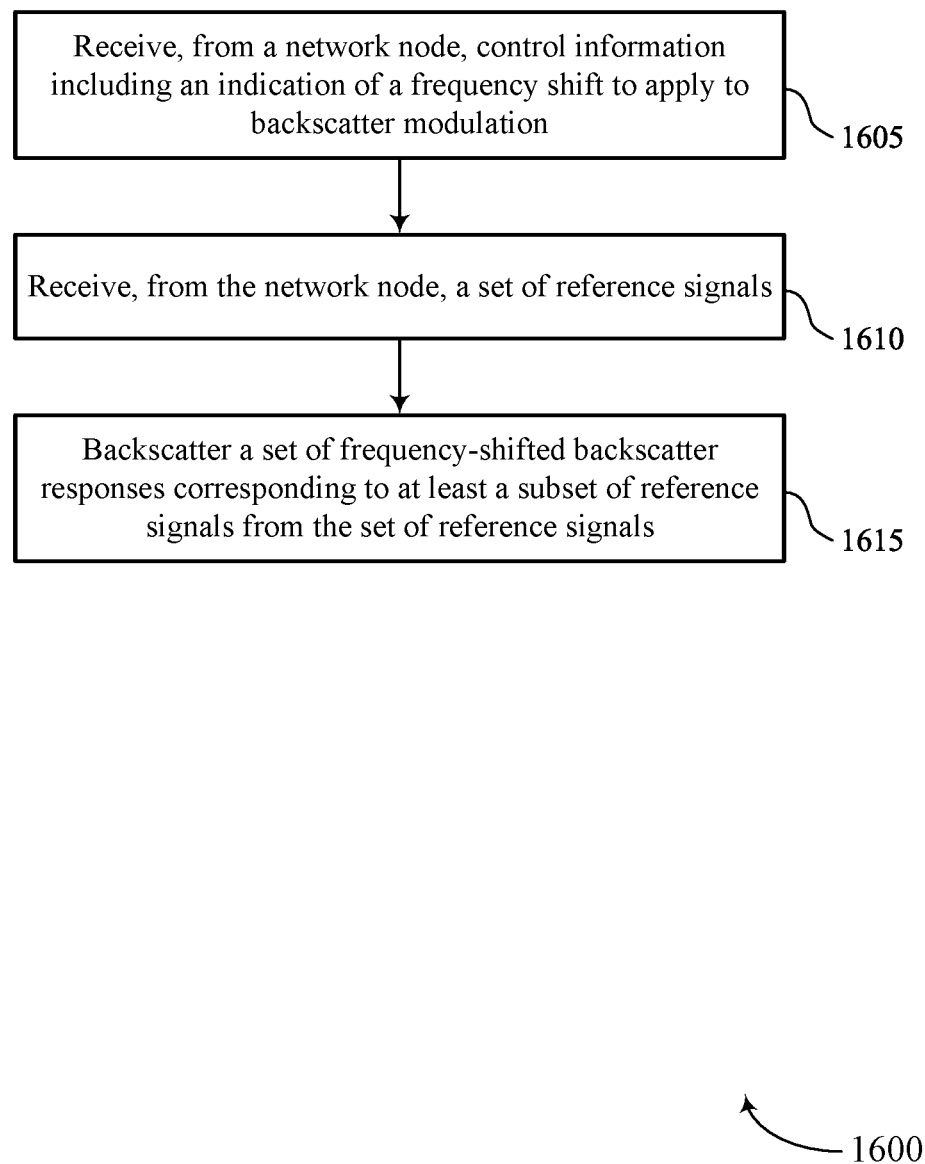

FIG. 16 shows a flowchart illustrating a method 1600 that supports two stage codebook beamforming for channel estimation in passive devices in accordance with aspects of the present disclosure. The operations of the method 1600 may be implemented by a UE or its components as described herein. For example, the operations of the method 1600 may be performed by a UE 115 as described with reference to FIGS. 1 through 4 and 9 through 12. In some examples, a UE may execute a set of instructions to control the functional elements of the wireless UE to perform the described functions. Additionally, or alternatively, the wireless UE may perform aspects of the described functions using special-purpose hardware.

At 1605, the method may include receiving, from a network node, control information including an indication of a frequency shift to apply to backscatter modulation. The operations of 1605 may be performed in accordance with examples as disclosed herein. In some examples, aspects of the operations of 1605 may be performed by a frequency shift manager 1125 as described with reference to FIG. 11.

At 1610, the method may include receiving, from the network node, a set of reference signals. The operations of 1610 may be performed in accordance with examples as disclosed herein. In some examples, aspects of the operations of 1610 may be performed by a reference signal manager 1130 as described with reference to FIG. 11.

At 1615, the method may include backscattering a set of frequency-shifted backscatter responses corresponding to at least a subset of reference signals from the set of reference signals. The operations of 1615 may be performed in accordance with examples as disclosed herein. In some examples, aspects of the operations of 1615 may be performed by a backscatter manager 1135 as described with reference to FIG. 11.

Figure 17:
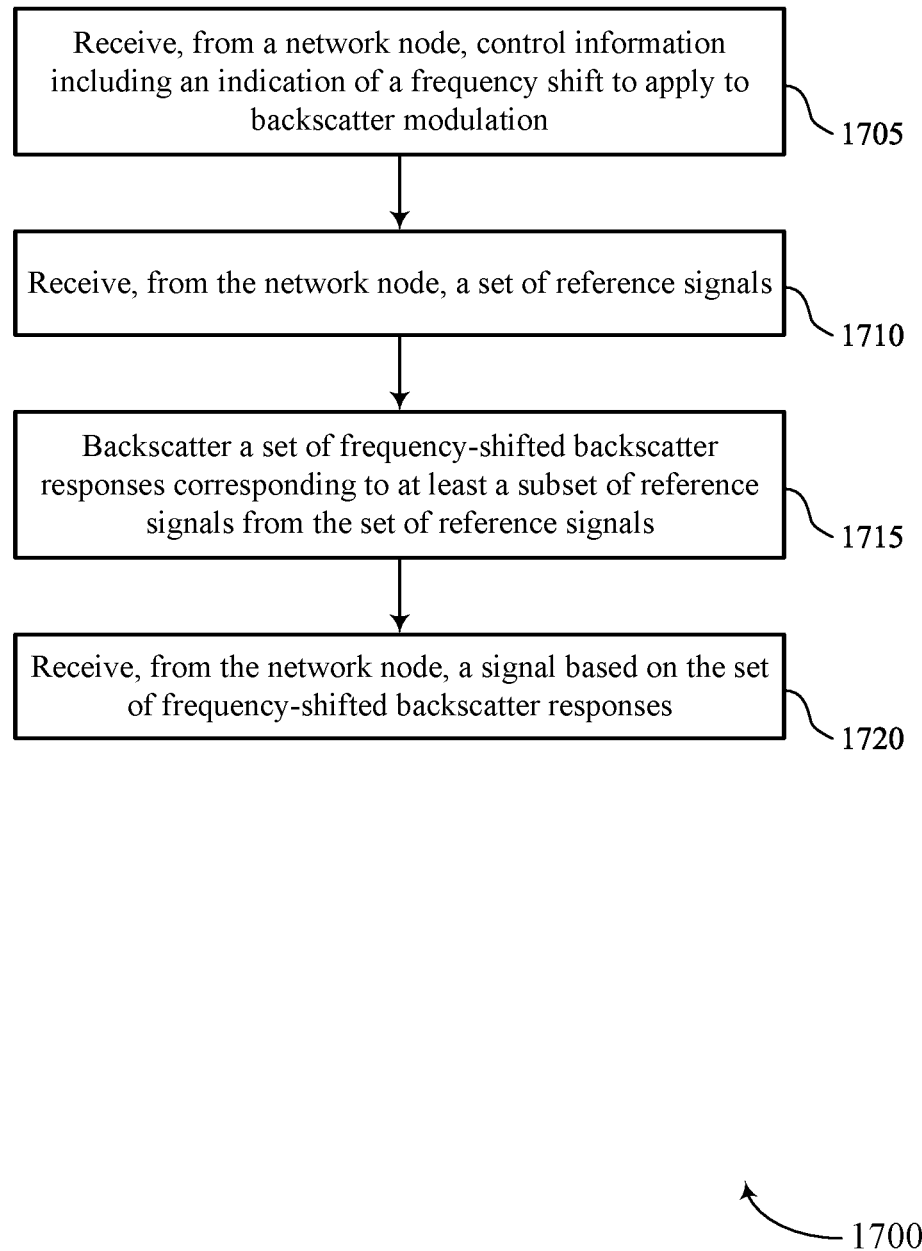

FIG. 17 shows a flowchart illustrating a method 1700 that supports two stage codebook beamforming for channel estimation in passive devices in accordance with aspects of the present disclosure. The operations of the method 1700 may be implemented by a UE or its components as described herein. For example, the operations of the method 1700 may be performed by a UE 115 as described with reference to FIGS. 1 through 4 and 9 through 12. In some examples, a UE may execute a set of instructions to control the functional elements of the wireless UE to perform the described functions. Additionally, or alternatively, the wireless UE may perform aspects of the described functions using special-purpose hardware.

At 1705, the method may include receiving, from a network node, control information including an indication of a frequency shift to apply to backscatter modulation. The operations of 1705 may be performed in accordance with examples as disclosed herein. In some examples, aspects of the operations of 1705 may be performed by a frequency shift manager 1125 as described with reference to FIG. 11.

At 1710, the method may include receiving, from the network node, a set of reference signals. The operations of 1710 may be performed in accordance with examples as disclosed herein. In some examples, aspects of the operations of 1710 may be performed by a reference signal manager 1130 as described with reference to FIG. 11.

At 1715, the method may include backscattering a set of frequency-shifted backscatter responses corresponding to at least a subset of reference signals from the set of reference signals. The operations of 1715 may be performed in accordance with examples as disclosed herein. In some examples, aspects of the operations of 1715 may be performed by a backscatter manager 1135 as described with reference to FIG. 11.

At 1720, the method may include receiving, from the network node, a signal based on the set of frequency-shifted backscatter responses. The operations of 1720 may be performed in accordance with examples as disclosed herein. In some examples, aspects of the operations of 1720 may be performed by a CSI manager 1140 as described with reference to FIG. 11.

The following provides an overview of aspects of the present disclosure:

Aspect 1: A method for wireless communications at a network node, comprising: transmitting a set of reference signals via a corresponding set of antennas, each antenna in the corresponding set of antennas associated with a unique precoding vector, wherein each precoding vector uses a combinational codeword based on a combination of codewords from a set of available codewords; receiving, from an EH-capable device, a set of frequency-shifted backscatter responses corresponding to at least a subset of the set of reference signals; and transmitting, to the EH-capable device, a signal based on channel state information, wherein the channel state information is based on the set of frequency-shifted backscatter responses.

Aspect 2: The method of aspect 1, further comprising: combining a first set of codewords from a DFT codebook to obtain a first combination of codewords to determine a first precoding vector used when transmitting a first reference signal in the set of reference signals, wherein the DFT codebook comprises the set of available codewords; and combining a second set of codewords from the DFT codebook to obtain a second combination of codewords to determine a second precoding vector used when transmitting a second reference signal in the set of reference signals, wherein the first set of codewords and the second set of codewords comprise one or more different codewords.

Aspect 3: The method of aspect 2, further comprising: determining a number of codewords to be included in the first set of codewords, the second set of codewords, or both, based at least in part on a previously received set of frequency-shifted backscatter responses.

Aspect 4: The method of aspect 3, wherein the number of codewords are determined based at least in part on ratio between the previously received set of frequency-shifted backscatter responses and the number of codewords satisfying a threshold.

Aspect 5: The method of any of aspects 1 through 4, further comprising: identifying, based at least in part on the set of frequency-shifted backscatter responses, a subset of precoding vectors to use for subsequent transmissions to the EH-capable device.

Aspect 6: The method of any of aspects 1 through 5, further comprising: identifying a subset of frequency-shifted backscatter responses from the set of frequency-shifted backscatter responses that satisfy a threshold; and transmitting, based at least in part on the subset of frequency-shifted backscatter responses, a second set of reference signals via a corresponding subset of antennas in the corresponding set of antennas.

Aspect 7: The method of aspect 6, further comprising: changing a transmission frequency for the second set of reference signals relative to the set of reference signals.

Aspect 8: The method of any of aspects 6 through 7, further comprising: performing multiple transmissions of the second set of reference signals via the corresponding subset of antennas.

Aspect 9: The method of any of aspects 6 through 8, wherein each antenna in the subset of antennas is associated with the precoding vector used during transmission of the set of reference signals or with an updated precoding vector different from the precoding vector, the updated precoding vector is based on the threshold.

Aspect 10: The method of any of aspects 1 through 9, further comprising: determining the channel state information based at least in part on a subset of the frequency-shifted backscatter responses from the set of frequency-shifted backscatter responses.

Aspect 11: The method of any of aspects 1 through 10, further comprising: time division multiplexing, frequency division multiplexing, code division multiplexing, or a combination thereof, the reference signals in the set of reference signals.

Aspect 12: The method of any of aspects 1 through 11, further comprising: selecting a precoding vector to use to transmit the signal based at least in part on the set of frequency-shifted backscatter responses.

Aspect 13: A method for wireless communications at an EH-capable device, comprising: receiving, from a network node, control information including an indication of a frequency shift to apply to backscatter modulation; receiving, from the network node, a set of reference signals; and backscattering a set of frequency-shifted backscatter responses corresponding to at least a subset of reference signals from the set of reference signals.

Aspect 14: The method of aspect 13, wherein the control information indicates a same frequency shift to apply to the reference signals in the set of reference signals.

Aspect 15: The method of any of aspects 13 through 14, wherein the control information includes an identifier for the EH-capable device.

Aspect 16: The method of any of aspects 13 through 15, wherein the control information includes an indication to apply a same reflection coefficient to the set of reference signals.

Aspect 17: The method of any of aspects 13 through 16, further comprising: receiving, from the network node, a signal based on the set of frequency-shifted backscatter responses.

Aspect 18: An apparatus for wireless communications at a network node, comprising at least one processor; memory coupled with the at least one processor, the memory storing instructions executable by the at least one processor to cause the network node to perform a method of any of aspects 1 through 12.

Aspect 19: An apparatus for wireless communications at a network node, comprising at least one means for performing a method of any of aspects 1 through 12.

Aspect 20: A non-transitory computer-readable medium storing code for wireless communications at a network node, the code comprising instructions executable by at least one processor to perform a method of any of aspects 1 through 12.

Aspect 21: An apparatus for wireless communications at an EH-capable device, comprising at least one processor; and memory coupled with the at least one processor, the memory storing instructions executable by the at least one processor to cause the EH-capable device to perform a method of any of aspects 13 through 17.

Aspect 22: An apparatus for wireless communications at an EH-capable device, comprising at least one means for performing a method of any of aspects 13 through 17.

Aspect 23: A non-transitory computer-readable medium storing code for wireless communications at an EH-capable device, the code comprising instructions executable by at least one processor to perform a method of any of aspects 13 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), phase change memory, flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a network node, comprising:
    at least one processor; and
    memory coupled with the processor, the memory storing instructions executable by the at least one processor to cause the network node to:
        transmit a set of reference signals via a corresponding set of antennas, each antenna in the corresponding set of antennas associated with a unique precoding vector, wherein each precoding vector uses a combinational codeword based on a combination of codewords from a set of available codewords;
        receive, from an energy harvesting (EH)-capable device, a set of frequency-shifted backscatter responses corresponding to at least a subset of the set of reference signals; and
        transmit, to the EH-capable device, a signal based on channel state information, wherein the channel state information is based on the set of frequency-shifted backscatter responses.

2. The apparatus of claim 1, wherein the instructions are further executable by the at least one processor to cause the network node to:
    combine a first set of codewords from a discrete Fourier transform (DFT) codebook to obtain a first combination of codewords to determine a first precoding vector used when transmitting a first reference signal in the set of reference signals, wherein the DFT codebook comprises the set of available codewords; and
    combine a second set of codewords from the DFT codebook to obtain a second combination of codewords to determine a second precoding vector used when transmitting a second reference signal in the set of reference signals, wherein the first set of codewords and the second set of codewords comprise one or more different codewords.

3. The apparatus of claim 2, wherein the instructions are further executable by the at least one processor to cause the network node to:
determine a number of codewords to be included in the first set of codewords, the second set of codewords, or both, based at least in part on a previously received set of frequency-shifted backscatter responses.

4. The apparatus of claim 3, wherein the number of codewords are determined based at least in part on the previously received set of frequency-shifted backscatter responses and the number of codewords satisfying a threshold.

5. The apparatus of claim 1, wherein the instructions are further executable by the at least one processor to cause the network node to:
identifying, base at least in part on the set of frequency-shifted backscatter responses, a subset of precoding vectors to use for subsequent transmissions to the EH-capable device.

6. The apparatus of claim 1, wherein the instructions are further executable by the at least one processor to cause the network node to:
identify a subset of frequency-shifted backscatter responses from the set of frequency-shifted backscatter responses that satisfy a threshold; and
transmit, based at least in part on the subset of frequency-shifted backscatter responses, a second set of reference signals via a corresponding subset of antennas in the corresponding set of antennas.

7. The apparatus of claim 6, wherein the instructions are further executable by the at least one processor to cause the network node to:
change a transmission frequency for the second set of reference signals relative to the set of reference signals.

8. The apparatus of claim 6, wherein the instructions are further executable by the at least one processor to cause the network node to:
perform multiple transmissions of the second set of reference signals via the corresponding subset of antennas.

9. The apparatus of claim 6, wherein:
each antenna in the corresponding subset of antennas is associated with a precoding vector used during transmission of the set of reference signals or with an updated precoding vector different from the precoding vector, and
the updated precoding vector is based on the threshold.

10. The apparatus of claim 1, wherein the instructions are further executable by the at least one processor to cause the network node to:
determine the channel state information based at least in part on a subset of the frequency-shifted backscatter responses from the set of frequency-shifted backscatter responses.

11. The apparatus of claim 1, wherein the instructions are further executable by the at least one processor to cause the network node to:
time division multiplexing, frequency division multiplexing, code division multiplexing, or a combination thereof, reference signals in the set of reference signals.

12. The apparatus of claim 1, wherein the instructions are further executable by the at least one processor to cause the network node to:
select a precoding vector to use to transmit the signal based at least in part on the set of frequency-shifted backscatter responses.

13. An apparatus for wireless communications at an energy harvesting (EH)-capable device, comprising:
at least one processor; and
memory coupled with the at least one processor, the memory storing instructions executable by the at least one processor to cause the EH-capable device to:
receive, from a network node, control information including an indication of a frequency shift to apply to backscatter modulation;
receive, from the network node, a set of reference signals; and
backscatter a set of frequency-shifted backscatter responses corresponding to at least a subset of reference signals from the set of reference signals.

14. The apparatus of claim 13, wherein the control information indicates a same frequency shift to apply to reference signals in the set of reference signals.

15. The apparatus of claim 13, wherein the control information includes an identifier for the EH-capable device.

16. The apparatus of claim 13, wherein the control information includes an indication to apply a same reflection coefficient to the set of reference signals.

17. The apparatus of claim 13, wherein the instructions are further executable by the at least one processor to cause the EH-capable device to:
receive, from the network node, a signal based on the set of frequency-shifted backscatter responses.

18. A method for wireless communications at a network node, comprising:
transmitting a set of reference signals via a corresponding set of antennas, each antenna in the corresponding set of antennas associated with a unique precoding vector, wherein each precoding vector uses a combinational codeword based on a combination of codewords from a set of available codewords;
receiving, from an energy harvesting (EH)-capable device, a set of frequency-shifted backscatter responses corresponding to at least a subset of the set of reference signals; and
transmitting, to the EH-capable device, a signal based on channel state information, wherein the channel state information is based on the set of frequency-shifted backscatter responses.

19. The method of claim 18, further comprising:
combining a first set of codewords from a discrete Fourier transform (DFT) codebook to obtain a first combination of codewords to determine a first precoding vector used when transmitting a first reference signal in the set of reference signals, wherein the DFT codebook comprises the set of available codewords; and
combining a second set of codewords from the DFT codebook to obtain a second combination of codewords to determine a second precoding vector used when transmitting a second reference signal in the set of reference signals, wherein the first set of codewords and the second set of codewords comprise one or more different codewords.

20. The method of claim 19, further comprising:
determining a number of codewords to be included in the first set of codewords, the second set of codewords, or both, based at least in part on a previously received set of frequency-shifted backscatter responses.

21. The method of claim 20, wherein the number of codewords are determined based at least in part on the previously received set of frequency-shifted backscatter responses and the number of codewords satisfying a threshold.

22. The method of claim 18, further comprising:
identifying, based at least in part on the set of frequency-shifted backscatter responses, a subset of precoding vectors to use for subsequent transmissions to the EH-capable device.

23. The method of claim 18, further comprising:
identifying a subset of frequency-shifted backscatter responses from the set of frequency-shifted backscatter responses that satisfy a threshold; and
transmitting, based at least in part on the subset of frequency-shifted backscatter responses, a second set of reference signals via a corresponding subset of antennas in the corresponding set of antennas.

24. The method of claim 23, further comprising:
changing a transmission frequency for the second set of reference signals relative to the set of reference signals.

25. The method of claim 23, further comprising:
performing multiple transmissions of the second set of reference signals via the corresponding subset of antennas.

26. The method of claim 23, wherein:
each antenna in the corresponding subset of antennas is associated with a precoding vector used during transmission of the set of reference signals or with an updated precoding vector different from the precoding vector, and
the updated precoding vector is based on the threshold.

27. The method of claim 18, further comprising:
determining the channel state information based at least in part on a subset of the corresponding frequency-shifted backscatter responses from the set of frequency-shifted backscatter responses.

28. The method of claim 18, further comprising:
time division multiplexing, frequency division multiplexing, code division multiplexing, or a combination thereof, reference signals in the set of reference signals.

29. The method of claim 18, further comprising:
selecting a precoding vector to use to transmit the signal based at least in part on the set of frequency-shifted backscatter responses.

30. A method for wireless communications at an energy harvesting (EH)-capable device, comprising:
receiving, from a network node, control information including an indication of a frequency shift to apply to backscatter modulation;
receiving, from the network node, a set of reference signals; and
backscattering a set of frequency-shifted backscatter responses corresponding to at least a subset of reference signals from the set of reference signals.

* * * * *